(12) United States Patent
Siani Cohen et al.

(10) Patent No.: US 11,860,968 B2
(45) Date of Patent: *Jan. 2, 2024

(54) SYSTEM AND METHOD FOR INTEGRATING USER FEEDBACK INTO WEBSITE BUILDING SYSTEM SERVICES

(71) Applicant: Wix.com Ltd., Tel Aviv (IL)

(72) Inventors: Hana Siani Cohen, Holon (IL); Oded Nachshon, Ramat Gan (IL); Noa Stanger, Shimshit (IL); Shai Dekel, Arsuf (IL); Meir Perez, Modi'in-Maccabim-Reut (IL); Hila Gat, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,485

(22) Filed: Mar. 14, 2022

(65) Prior Publication Data

US 2022/0197969 A1   Jun. 23, 2022

Related U.S. Application Data

(63) Continuation of application No. 16/878,831, filed on May 20, 2020, now Pat. No. 11,275,815.

(Continued)

(51) Int. Cl.
  *G06F 3/045*  (2006.01)
  *G06F 16/958* (2019.01)
  (Continued)

(52) U.S. Cl.
  CPC ........ *G06F 16/972* (2019.01); *G06F 11/3438* (2013.01); *G06N 3/045* (2023.01); *G06N 20/20* (2019.01)

(58) Field of Classification Search
  CPC ... G06F 16/972; G06F 11/3438; G06N 20/00; G06N 3/045
  See application file for complete search history.

(56) References Cited

U.S. PATENT DOCUMENTS 9,747,258 B2   8/2017   Ben-Aharon
9,996,566 B2   6/2018   Ben-Aharon
(Continued)

FOREIGN PATENT DOCUMENTS

EP     3462399      4/2019
WO   2008094712    8/2008
WO   2017208135   12/2017

OTHER PUBLICATIONS

International Search Report for corresponding PCT application PCT/IL2020/050554 dated Jul. 27, 2020.

(Continued)

*Primary Examiner* — Kyle R Stork
(74) *Attorney, Agent, or Firm* — HEIDI BRUN ASSOCIATES LTD.

(57) ABSTRACT

A website building system (WBS) includes a processor implementing a machine learning feedback-based proposal module and a database storing at least the websites of a plurality of users of the WBS, and components of the websites. The module includes a plurality of per activity AI units and a feedback system. Each per activity AI unit supports one or more specific activity related to the WBS and provides at least one system suggestion to the users related to its specific activity. Each per activity AI unit includes at least one machine learning model suitable for the activity supported by its per activity AI unit. The feedback system provides a plurality of different kinds of feedback from the users for updating the machine learning models. The feedback system analyzes the feedback to determine (Continued)

which one of the at least one machine learning models to update.

16 Claims, 13 Drawing Sheets

Related U.S. Application Data

(60) Provisional application No. 63/027,369, filed on May 20, 2020, provisional application No. 62/970,034, filed on Feb. 4, 2020, provisional application No. 62/905,450, filed on Sep. 25, 2019, provisional application No. 62/853,191, filed on May 28, 2019.

(51) Int. Cl.
  *G06F 11/34* (2006.01)
  *G06N 20/20* (2019.01)
  *G06N 3/045* (2023.01)

(56) References Cited

U.S. PATENT DOCUMENTS

| | | |
|---|---|---|
| 10,073,923 B2 | 9/2018 | Koren |
| 10,176,154 B2 | 1/2019 | Ben-Aharon |
| 10,185,703 B2 | 1/2019 | Abrahami |
| 11,275,815 B2 * | 3/2022 | Siani Cohen .......... G06N 20/20 |
| 2008/0150964 A1 * | 6/2008 | Cho .................... H04N 21/4438 |
| | | 375/E7.006 |
| 2013/0054348 A1 * | 2/2013 | Holsman ................ G06Q 30/00 |
| | | 705/14.43 |
| 2013/0171594 A1 * | 7/2013 | Gorman ................... G09B 5/00 |
| | | 434/219 |
| 2013/0275892 A1 * | 10/2013 | Li .......................... G06F 3/0482 |
| | | 715/762 |
| 2014/0282218 A1 | 9/2014 | Kaufman |
| 2017/0140241 A1 * | 5/2017 | Maloney ................... G06T 7/11 |
| 2017/0222960 A1 | 8/2017 | Agarwal |
| 2018/0032626 A1 | 2/2018 | Ben-Aharon |
| 2018/0203826 A1 | 7/2018 | Ansel |
| 2018/0293323 A1 | 10/2018 | Abrahami |
| 2019/0042737 A1 | 2/2019 | Krebs |
| 2019/0163728 A1 | 5/2019 | Koren |
| 2020/0065712 A1 | 2/2020 | Wang |

OTHER PUBLICATIONS

Extended European Search Report for corresponding EP application 20 812 870.2 dated May 4, 2022.

* cited by examiner

SYSTEM AND METHOD FOR INTEGRATING USER FEEDBACK INTO WEBSITE BUILDING SYSTEM SERVICES

CROSS REFERENCE TO RELATED APPLICATIONS

This application is a Continuation application of U.S. patent application Ser. No. 16/878,831, filed May 20, 2020 which claims priority from U.S. provisional patent applications 62/853,191, filed May 28, 2019, 62/905,450, filed Sep. 25, 2019, 62/970,034, filed Feb. 4, 2020, and 63/027,369, filed May 20, 2020, all of which are incorporated herein by reference.

FIELD OF THE INVENTION

The present invention relates to website building systems generally and to site creation based on feedback in particular.

BACKGROUND OF THE INVENTION

Website building systems are used by both novices and professionals to create interactive websites. Existing website building systems are based on a visual editing model and most website building systems typically provide multiple templates, with a template possibly including a complete sample website, a website section, a single page or a section of a page.

Website building system users (also known as designers, subscribers, subscribing users or site editors) may design the website and the website's end-users (the "users of users") may access the websites created by the users. Although end-users typically access the system in read-only mode, website building systems (and websites) may allow end-users to perform changes to the web site, such as adding or editing data records, adding talkbacks to news articles, adding blog entries to blogs, etc. The website building system may allow multiple levels of users (i.e. more than two levels) and may assign different permissions and capabilities to each level. Users of the website building system may register in the website building system server which manages the users, their web sites and accesses by the end-users.

A website building system may be a standalone system or may be embedded inside a larger editing system. It may also be on-line (i.e. applications are edited and stored on a server), off-line or partially on-line (with web sites being edited locally but uploaded to a central server for publishing). The website building system may use an internal data architecture to store website building system-based sites and this architecture may organize the handled sites' internal data and elements inside the system. This architecture may be different from the external view of the site (as seen, for example, by the end-users). It is also typically different from the way that the HTML pages sent to the browser are organized.

For example, the internal data architecture may contain additional properties for each element in the page (creator, creation time, access permissions, link to templates, SEO (search engine optimization) related information, etc.) which are relevant for the editing and maintenance of the site in the website building system, but are not externally visible to end-users (or even to some editing users). The website building system may implement some of its functionality (including both editing and run-time functionality) on a server or server set, and some of its functionality on client elements. The website building system may also determine dynamically whether to perform some functionality on the server or on the client platform.

A website building system typically handles the creation and editing of visually designed applications (such as a website). In some website building systems, such as those provided by Wix.Com, the applications consist of pages, containers and components. Pages may be separately displayed and contain components. Components may include containers as well as atomic components.

The website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less or may have internal content. An example of the first category is a star-shape component, which does not have any internal content (though it has color, size, position, attributes and other parameters). An example of the second category is a text paragraph component, whose internal content includes the internal text as well as the font, formatting and layout information (which is also part of the content rather than being attributes of the component). This content may, of course, vary from one instance of the text paragraph component to another. Components which have content are often referred to as fields (e.g. a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The website building system may provide inheritance between templates, pages or components, possibly including multi-level inheritance, multiple inheritance and diamond inheritance (i.e. A inherits from B and C and both B and C inherit from D).

The visual arrangement of components inside a page is called a layout. The website building system may also support dynamic layout processing, a process whereby the editing of a given component (or other changes affecting it such as externally-driven content change) may affect other components, as further described in U.S. Pat. No. 10,185,703 entitled "Website Design System Integrating Dynamic Layout and Dynamic Content", granted on 22 Jan. 2019, commonly owned by the Applicant and incorporated herein by reference.

A website building system may be extended using add-on applications such as a third party application and its components, list applications (such as discussed in US Patent Publication No. US 2014/0282218 entitled "Website Building System Integrating Data Lists with Dynamic Customization and Adaptation" published 18 Sep. 2014, commonly owned by the Applicant and incorporated herein by reference) and website building system configurable applications (such as described in in US Patent Publication No. 2020/0151226 entitled "System And Method for Creation and Handling of Configurable Applications for Website Building Systems", published May 14, 2020, commonly owned by the Applicant and incorporated herein by reference). These third-party applications and list applications may be added and integrated into designed websites.

Such third party applications and list applications may be purchased (or otherwise acquired) through a number of distribution mechanisms, such as being pre-included in the web site building system design environment, from an Application Store (integrated into the website building system's market store or external to it) or directly from the third-party application vendor.

The third-party application may be hosted on the website building system vendor's own servers, the third-party application vendor's server or on a fourth party server infrastructure.

The website building system may also allow procedural code to be added to some or all of the system's entities. Such code could be written in a standard language (such as JavaScript), an extended version of a standard language or a language proprietary to the specific website building system. The executed code may reference API's provided by the website building system itself or external providers. The code may also reference internal constructs and objects of the website building system, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions.

The activated code may be executed inside the website building system's client element, on the server platform or by using a combination of the two or a dynamically determined execution platform. Such a system is described in US Patent Publication No. US 2018/0293323 entitled "System and Method for Smart Interaction Between Website Components", published 11 Oct. 2018, commonly owned by the Applicant and incorporated herein by reference.

Typical site creation may be based on a number of models, including a visual editing model (in which the user edits a previously created site) and an automatic site generation model or a combination thereof, as illustrated in FIG. 1 to which reference is now made and is described in U.S. Pat. No. 10,073,923 entitled "System and Method for the Creation and Update of Hierarchical Websites Based on Collected Business Knowledge", granted 11 Sep. 2018, commonly owned by the Applicant and incorporated herein by reference.

It will be appreciated that, throughout the specification, the acronym WBS may be used to represent a website building system. FIG. 1 illustrates a system 100 that comprises a typical website building system 5 in communication with client systems operated by WBS vendor staff 61, a site designer 62 (i.e. a user), a site viewer 63 (i.e. user of user) and with external systems 70. Website building system 5 may further comprise a WBS (website building system) site manager 10, an object marketplace 15, a WBS RT (runtime) server 20, a WBS editor 30, a site generation system 40 and a WBS content management system (CMS) 50. It will be appreciated that the elements of FIG. 1 may function as described in U.S. Pat. No. 10,073,923.

In the visual editing model, the user (designer) edits a site based on one or more website templates. The website building system provider may provide multiple site (or other) templates, as described hereinabove. Users may have the option to start with an empty site (essentially a "blank page" template) but would typically start with an actual site template.

The website building system provider may provide site templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the website building system.

Thus, the user's first experience when creating a site using a website building system visual editor may typically be that the user chooses a template (e.g. according to style or industry type/sub-type), and then edits the template in the visual editor, including the editing of content, logic, layout and attributes. Such editing may include adapting the template and its elements to the details of the user's business. The user may then publish the modified site.

Under the site generation model, the website building system generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each instance displaying the details of a different instance of an underlying entity (e.g. different products offered in the site). Such multiple instances may be manually specified (e.g. the details of different persons in the company's management team) or dynamically derived from an external database (e.g. product details from the "products on sale" database). Such an arrangement is often known as a "repeater".

The template may also include fields. For example, the website building system may allow the template designer to specify fields (also known as "placeholders") for the insertion of values inside the templates, such as {CompanyName}, {ProductName}, {ProductPrice} etc. The user may also specify the values for the fields defined in the template selected for the website.

The website building system may allow the user to enter simple or complex values (e.g. text and images), as well as additional (non-field) information, such as selection of included pages or web site areas, colors, style information, links, formatting options, website display options, decoration elements (such as borders and backgrounds), etc.

The website building system may also allow the user to enter some of this additional information before selecting a template and may use this information to help in selecting a template (e.g. by narrowing the set of proposed templates). For example, the user may select a certain generic color scheme (e.g. pastel colors) or style (e.g. business/formal), and the system may then use this selection to narrow the set of proposed templates.

The system may also display a series of views or questionnaires to allow the user to enter values or selections (for both the defined fields and the additional information above). The system may further create a connection (or binding) between a multiple-instance element of the template (as described herein above) and an internal or external database which provides the data instances used to generate the displayed instances.

Once a template has been selected and its fields and additional information have been specified (e.g. through the questionnaires or through binding to data sources), the website building system may generate the website containing the combined information. The user may then publish the site (through the website building system or otherwise).

A website building system may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g. distinguishing between real-estate lawyers and personal injury lawyers).

The system may also gather external information from other sites, both internal and external to the system. Such information may affect, for example, the selection of offered questionnaires and layout elements, proposed defaults, etc. Such information may also typically be collected on a statistical or summary basis, in order not to expose information belonging to any single user, and to protect users' privacy, anonymity and legal rights (such as copyrights). Such information may be located based on information provided by the user which may be direct (e.g. an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic (i.e. including user interaction).

To support the above-mentioned functionality above, a website building system will typically maintain a series of repositories, stored over one or more servers or server farms. Such repositories may typically include various related repositories, such as a user information/profile repository, a WBS component repository, a WBS site repository, a Business Intelligence (BI) repository, an editing history repository, a third-party application store repository, etc. The system may also include site/content creation related repositories, such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

SUMMARY OF THE PRESENT INVENTION

There is therefore provided, in accordance with a preferred embodiment of the present invention, a website building system (WBS) and a method implemented thereon. The system includes a processor implementing a machine learning feedback-based proposal module and a database storing at least the websites of a plurality of users of the WBS and components of the websites. The module includes a plurality of per activity AI units and a feedback system. Each unit supports one or more specific activity related to the WBS and provides at least one system suggestion to users of the WBS related to its the specific activity. Each per activity AI unit includes at least one machine learning model suitable for the activity supported by its the per activity AI unit. The feedback system provides a plurality of different kinds of feedback from the users for updating the at least one machine learning model. The feedback system analyzes the feedback to determine which of the at least one machine learning models to update.

Moreover, in accordance with a preferred embodiment of the present invention, the feedback system includes an implicit feedback handler to analyze at least editing histories of the users to determine what further activity the users perform on their websites and/or within the WBS and to generate therefrom implicit feedback to train relevant the machine learning models.

Further, in accordance with a preferred embodiment of the present invention, the feedback system also includes an explicit feedback handler which analyzes at least user responses to the at least one system suggestion to determine how the users respond to the at least one system suggestion and which generates therefrom explicit feedback to train relevant the machine learning models.

Still further, in accordance with a preferred embodiment of the present invention, the WBS also includes an editor operative with the proposal module. The tasks include at least one single component task within the editor. The single component task can be image resolution improvement, face detection, portrait segmentation, objection segmentation, image cropping, image enhancement, logo creation or site text generation.

Further, in accordance with a preferred embodiment of the present invention, the tasks include at least one multi-component task improving site function. The multi-component task can be component grouping, component group labeling, component ordering, object analysis, object transformation, desktop to mobile transformation, importation of websites, template replacement, support of responsive editors or alternate design suggestion.

Still further, in accordance with a preferred embodiment of the present invention, each the per activity AI unit includes an interaction generator to provide at least one suggestion related to each the activity to the users based on the output of the at least one machine learning model.

Moreover, in accordance with a preferred embodiment of the present invention, wherein the at least one machine learning model is a model suited to the task and selected from one or more of the following types of models: supervised, unsupervised, prediction algorithms, classification algorithms, clustering algorithms, association algorithms, time-series forecasting algorithms, image to image models, sequence to sequence models, and Generative models.

Further, in accordance with a preferred embodiment of the present invention, the feedback system also includes at least one of a response evaluator to evaluate a response quality of feedback responses from the users, a user evaluator to evaluate a user quality in giving feedback, a vendor handler to analyze feedback at least from vendor staff of the WBS, and a community handler to analyze feedback at least from a community of users.

Still further, in accordance with a preferred embodiment of the present invention, the proposal module updates at least one of the machine learning models periodically and/or based on user activity. The user activity can be whenever a user makes a change to the website or whenever the user publishes the website.

Moreover, in accordance with a preferred embodiment of the present invention, the explicit feedback handler receives a plurality of object types from a plurality of interaction formats.

Further, in accordance with a preferred embodiment of the present invention, the implicit feedback handler receives information gathered from within the WBS. The information can be disposition of the component and/or business information, user information, and site information.

Moreover, in accordance with a preferred embodiment of the present invention, the at least one machine learning model is multiple models for multiple WBS tasks. In one embodiment, a first one of the multiple models interacts with a second one of the multiple models, such as the first model assists the second model or the first model provides transfer learning to the second model.

Further, in accordance with a preferred embodiment of the present invention, a first one of the multiple models receives input from a different population of users than a second one of the multiple models. For example, the population is defined as being per country, per community, per group, or per user profile.

Still further, in accordance with a preferred embodiment of the present invention, the feedback system infers a user profile of a particular user from one of the editing history of the particular user and information about the website of the particular user.

Moreover, in accordance with a preferred embodiment of the present invention, the interaction generator provides one of a plurality of interactions as a function of parameters of the user, of the website of the editing history.

Further, in accordance with a preferred embodiment of the present invention, the user quality is defined as a function of at least one of: the content of the feedback, a profile of the user, the editing history of the user and at least one previous score of the user for previous responses.

Still further, in accordance with a preferred embodiment of the present invention, the user evaluator disqualifies the user from providing further feedback if the user quality is lower than a predefined threshold.

Moreover, in accordance with a preferred embodiment of the present invention, when the at least one single component task is image cropping, its machine learning model is an image cropping model which infers that areas of an image covered by overlapping components are non-important areas of the image.

Finally, in accordance with a preferred embodiment of the present invention, the WBS also includes a site generation system which receives indications of non-important areas of a background image from at least one associated per activity AI unit and places layout elements over the non-important areas.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
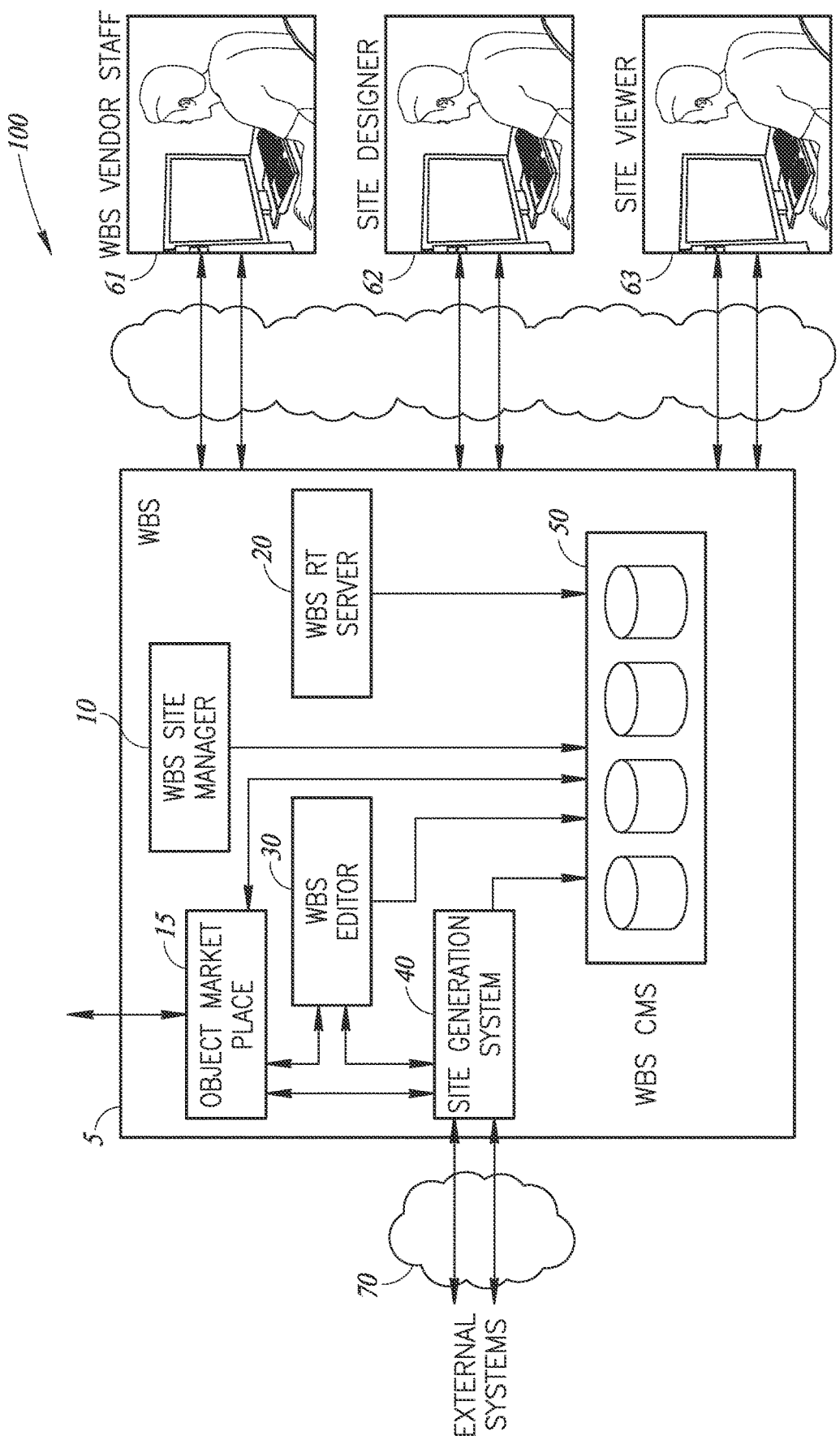
FIG. 1 is a schematic illustration of a prior art website building system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the website building process may be challenging for the novice builder or designer, especially those with limited technical knowledge. Novice designers may face problems both at the layout level (such as the arrangement of objects on pages) and at the editing level (such as the enhancement of an image). Applicant has further realized that even the most expert website designer may also be challenged by certain tasks, such as image enhancement and logo creation or other functionality that cannot be performed manually.

Applicant has also realized that the above mentioned challenges may be overcome by having a website building system that provides the designer/WBS user with a set of machine learning/artificial intelligence based services to support the website building and maintenance workflow (such as support for image cropping for images to be used in the website). The WBS may employ different types of feedback to train underlying machine learning models using different object types, feedback types and interaction formats, as well as gathered information available from within the website building system and information external to it which may be analyzed accordingly. The results of these data gathering/analysis/feedback interactions may then be integrated into the site design workflow.

Applicant has further realized that the WBS may employ specific models to determine from the results of the above mentioned analyses whether feedback from a specific user (or even the user himself) are trustworthy and whether it is necessary to weight the feedback response accordingly before it is used.

In the realm of website building systems, machine learning models/artificial intelligence may provide diverse solutions. Website design, creation, and maintenance involve a variety of tasks. These tasks are at different levels of abstraction and deal with objects of different types. Some of these tasks deal with media files (e.g., images, audio, and video) or text files/objects, while some deal with higher-level objects (such as the design and layout of a page section, a single page or a collection of pages). Some are highly mechanical or technical, while some involve a high degree of creativity or skill.

Applicant has realized that machine learning models should be designed for each particular activity and may be initially trained using vendor training data and enriched further using feedback from both implicit and explicit data from and about the WBS user (the designer) and his websites. Implicit feedback may include designer behavior information (editing history, business intelligence, general user info, etc.) and explicit feedback may be based on questions posed to the designer about suggestions or proposals (which suggested picture of the Taj Mahal is clearer?) at any appropriate point during website design, creation or maintenance. The models may be standalone, i.e. task specific only, or may act as sub-routines for other models.

Applicant has further realized that functionality and tasks involved with the automated processes of site creation (such as site generation, site import, conversions from other systems, conversions between different display platforms, etc.) may also be improved using the same data gathering/analysis/feedback interactions.

The use of feedback from the user to improve the performance of machine learning models is known in the art and is one form of reinforcement learning. One example is the classification of e-mails into spam and non-spam e-mails (such as US Patent Publication US20170222960A1 by Microsoft Technology Licensing LLC). In the case of spam e-mail classification, the user feedback is typically fairly simple; an e-mail can be classified into spam or non-spam (or maybe as "light spam" in some systems, i.e., spam e-mail which is not as obtrusive and irrelevant as most spam e-mails are). The simplicity of the response makes it easier to get user feedback than cases which require more complex feedback.

Another common example is web search engines, which track the actual search results selected by the user and use it to refine further searches. The results selected by the user provide training data for the search engine's machine learning models.

The machine learning tasks in the present invention involve editing or otherwise transforming a given object X to create a new or modified object Y. For example, taking an image X and transforming it into a modified image Y through editing, cropping, attribute change (brightness, contrast, etc.), quality improvement, etc.

The resulting object Y may be much more complex than a modified version of an image and may be an object or a set of objects which are very different from the object X. For example, in an object segmentation task applied to an image X, the result of the task may be a composite Z comprising a version of the image X which shows only the physical objects (detected in image X) over a modified background. However, composite Z may also comprise a set of high-level product details (e.g. based on matching the detected physical objects against an e-commerce product catalog) including such elements as object outline coordinates in the original image, product metadata, product classification, etc.

Another category of tasks may involve suggesting a given object or element to be added. This may be purely system initiated or based on user interaction. For example, the WBS may suggest an image (e.g. from a repository of system or other stock images) which is a good fit to the user's text in a certain site section. Conversely, the WBS may suggest text to fit an image. Thus, the WBS may add web-elements and not just edit existing ones.

As another example, the WBS may provide the user with the ability to perform template replacement. Users (designers) often build their site based on a template provided by the WBS vendor. The user may perform a substantial modification to this underlying template, including design and layout changes, insertion and removal of pages, page elements and site sections as well as the entry of user-specific site text, media, and data. The user may later desire to switch to a different template, which would require the user to map the changes (layout and content) to the new template and reapply them as appropriate. The machine learning tools of the present invention may provide high-level editing tools to perform this task and also automated tools and machine learning-based tools as described herein below. In such a case, the object being handled is not a mere image (or other media file) but an entire site.

It will be appreciated that the WBS may provide a variety of tools to perform these tasks, ranging from simple task-specific tools (e.g., image cropper, image attribute modifier) to media editing tools (e.g., an image editor) to full-scale page editing or similar tools (template replacement applier). These tasks may occur in various stages of the site creation workflow, e.g. at a preliminary media gathering and uploading stage, just before the site/page editing, during or in conjunction with or integrated with the site or page editing, or as part of the post-editing or publishing process.

Figure 2:
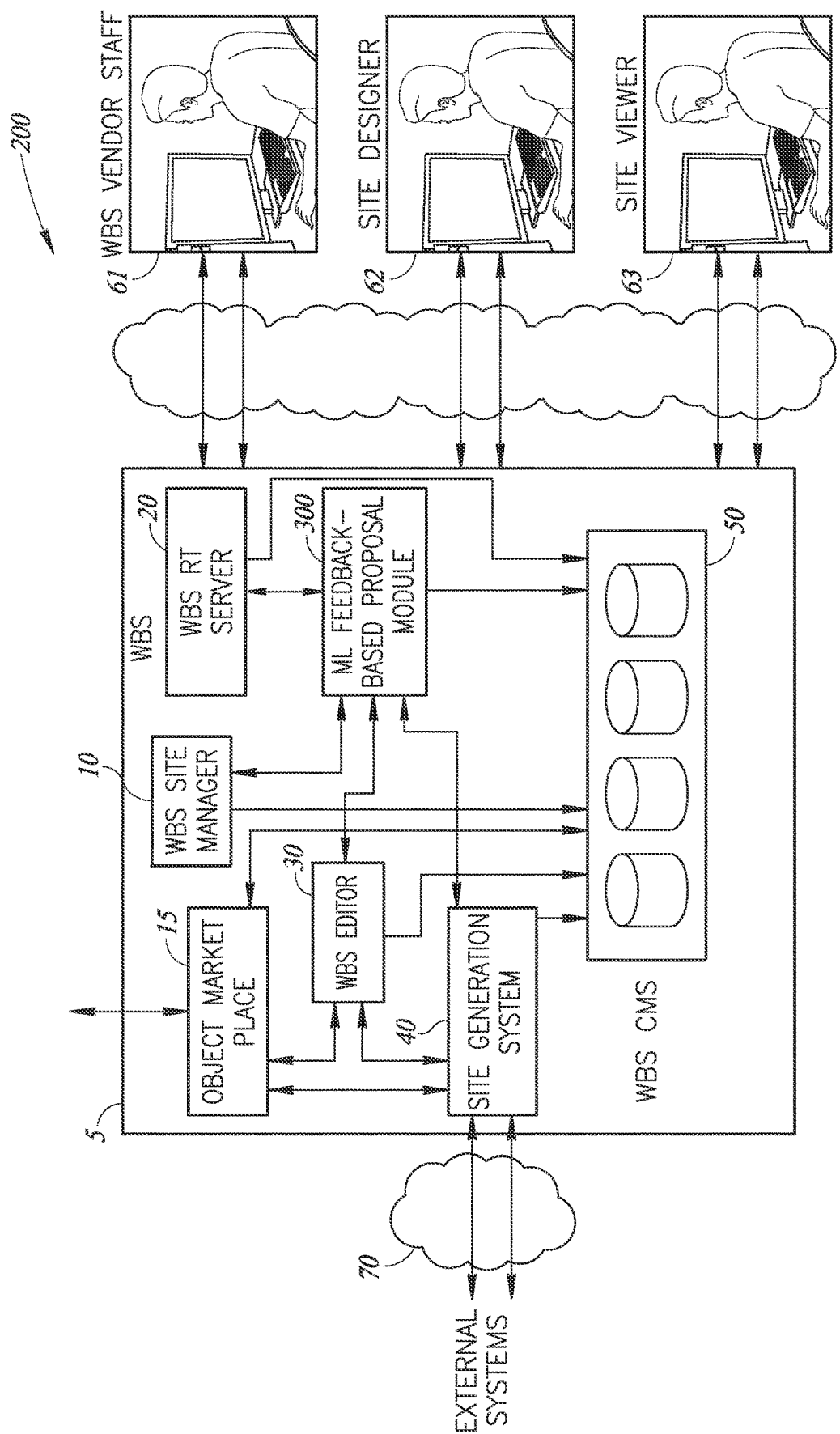
FIG. 2 is a schematic illustration of a system which integrates online machine learning feedback into website building system services, constructed and operative in accordance with an embodiment of the present invention.

Reference is now made to FIG. 2 which illustrates a system 200 which integrates online machine learning feedback into website building system services, constructed and operative in accordance with an embodiment of the present invention. As discussed herein above, for WBS systems, there are a variety of tasks which may benefit from machine learning models, and each of these models may, in turn, benefit from user feedback. System 200 may integrate feedback loops into the workflow of the WBS so as to make it easy (and desirable) for the user to provide the required response. In addition, the feedback loops may extract relevant feedback information from user activities. System 200 may aim to make the user feedback interaction a part of the regular WBS interaction required by the system in order to complete the required task.

System 200 may comprise the elements of system 100 as described in U.S. Pat. No. 10,073,923 (as well as any sub elements) in conjunction with an ML feedback-based proposal module 300. ML feedback-based proposal module 300 may interface with multiple parts of website building system 5 and, in particular, with WBS editor 30, site generation system 40 and CMS 50 as described in more detail herein below.

It will be appreciated that the following discussion refers to applications created by designers using WBS 5 and accessed by the end-users as websites, although system 200 may be applied to other categories of on-line applications which are accessed using specific client software (proprietary or not). End-users may access these web sites using client software on regular personal computers and also on smart-phones, tablet computers and other desktop, mobile or wearable devices. Alternatively, system 200 may be applicable to systems which generate mobile applications, native applications or other application types as described in U.S. Pat. No. 9,996,566 entitled "Visual Design System for Generating a Visual Data Structure Associated with a Semantic Composition Based on a Hierarchy of Components", granted 12 Jun. 2018, commonly owned by the Applicant and incorporated herein by reference.

Furthermore, the following discussion focuses on websites hosted by the website building system provider. It will be appreciated that the following discussion refers to the handling of imported images and their integration into an edited site. However, system 200 may handle other objects or object sets, such as images with additional information (cropping, embedded objects, identified faces/portraits/objects, etc.), text objects (fields or embedded text-type objects), other components, component collections, page layout, complete web pages, and complete sites.

Figure 3:
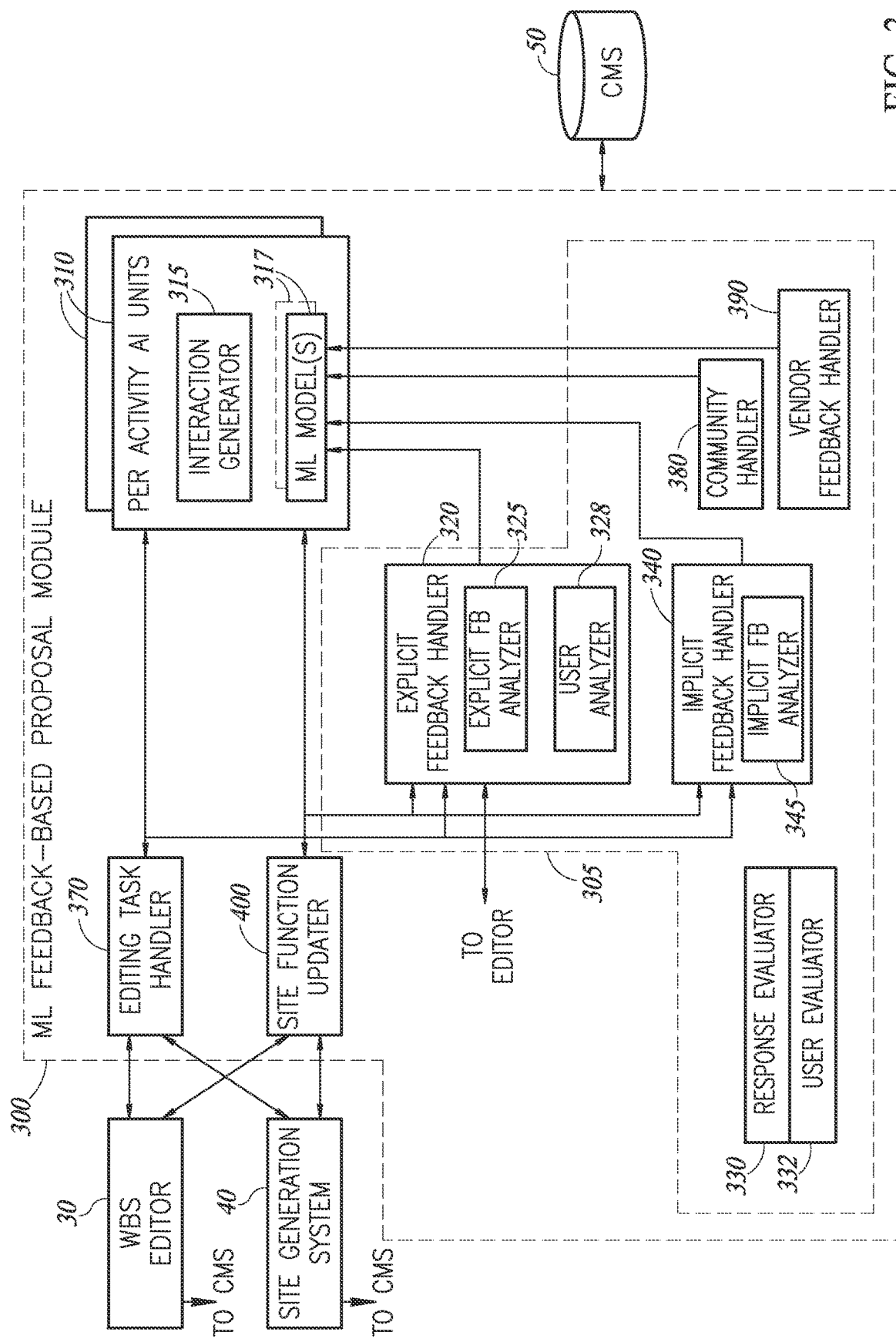
FIG. 3 is a schematic illustration of the elements of a machine learning feedback-based proposal module forming part of the system of FIG. 2.

Reference is now made to FIG. 3 which illustrates the elements of ML feedback-based proposal module 300. It will be appreciated that ML feedback-based proposal module 300 may enhance all forms of editing operations and WBS functionality by proposing possible enhancements to the current task of WBS user 61 or 62, where these enhancements may be drawn from previously received feedback from the community of WBS users 61 or 62. Module 300 may comprise one or more per activity AI units 310 (as described in more detail herein below), each specifically designed for its associated editing task or WBS system task. Each per activity AI unit 310 may be a module for enhancing a particular editing task or WBS system task and may generate a specific interaction UI for that particular activity to which WBS user 61 or 62 may respond. Each per activity AI unit 310 may comprise an interaction generator 315 and at least one ML model 317, trained for the particular activity or task. Alternatively, multiple per activity AI units 310 may share one interaction generator 315 and/or units 310 may comprise multiple ML models 317 and explicit feedback handler 320 may also operate with one of the interaction generators 315.

ML feedback-based proposal module 300 may additionally comprise an editing task handler 370 to provide the task specific suggestions from the relevant AI unit 310 to the WBS user 61 or 62 for single object operations and a site function updater 400 to provide such suggestions for multiple object operations. Each of editing task handler 370 and site function updater 400 may communicate with either WBS editor 30 or site generation system 40, as appropriate and as described hereinbelow with respect to FIGS. 7 and 8.

In addition, ML feedback-based proposal module 300 may comprise a feedback system 305 comprising an explicit feedback handler 320, an implicit feedback handler 340, a community handler 380, and a vendor feedback handler 390 to provide user feedback to ML models 317 to improve their functioning, based on what WBS users 61 and 62 have done. ML models 317 may be updated or retrained at any suitable time, such as during operation, periodically, when triggered, such as when a user changes or publishes his/her website.

As described in more detail hereinbelow, feedback system 305 may analyze the feedback received from users to determine which machine learning models to train.

Explicit feedback handler 320 may further comprise an explicit feedback analyzer 325 and a user analyzer 328. Implicit feedback handler 340 may further comprise an implicit feedback analyzer 345. The functions of these elements are discussed in more detail herein below. Alternatively, though not shown in FIG. 3 for clarity purposes, analyzers 325, 328 and 345 may operate within per activity AI units 310, particularly when they are very specific to the activity being reviewed by the specific per activity AI unit 310. As discussed herein above, system 200 may use machine learning models to support the user in performing various tasks. System 200 may integrate user feedback gathering (both explicit and implicit) into the WBS workflow and into the various tasks themselves. System 200 may utilize provided feedback together with additional information known to the WBS to improve the ML models 317. Such information may include current and historical information regarding the user, his or her media, and his or her website(s), as well as information related to additional users and sites. Such information may include (for example) parameters of the user (geography, experience, professional design status, etc.), the user's web site(s) parameters (e.g., the template used or hints from the template) and additional gathered information. This information may be stored in any of the repositories in CMS 50 as described in more detail herein below.

Figure 4:
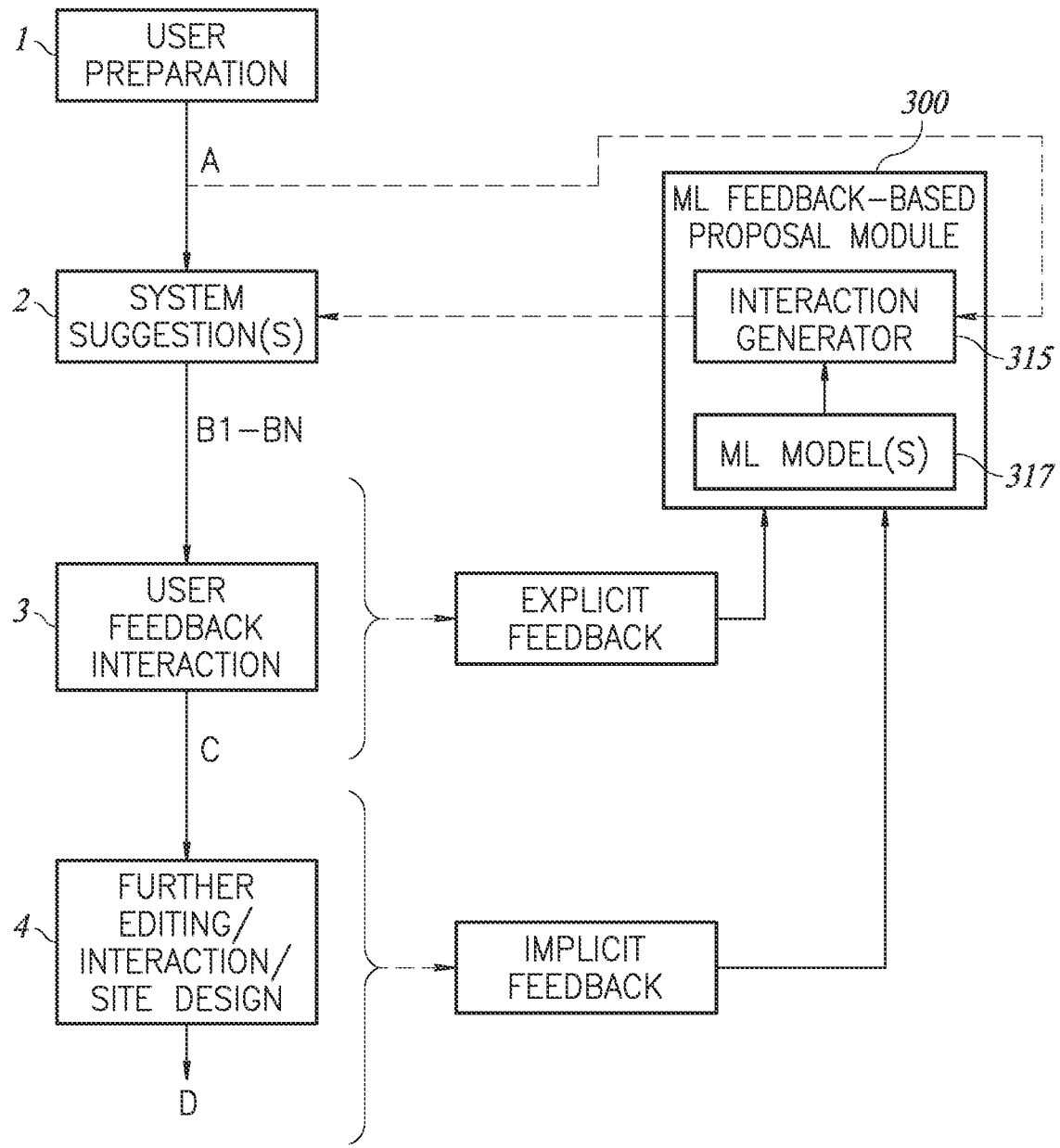
FIG. 4 is a flowchart illustration of a typical user workflow for system of FIG. 2.

Reference is now made to FIG. 4 which illustrates a typical user workflow for system 200. In stage 1 (user preparation), the WBS user selects an object (such as an image, layout page or otherwise) to be handled in a given task, typically via WBS editor 30. Alternatively, the user may upload an image to be used (after editing) in the current website. The result is a selected object A for handling.

In stage 2 (system suggestion), editing task handler 370 or site function updater 400 may receive object A and may provide it to the relevant AI unit 310 whose ML model 317 may analyze it to determine a set of "suggestions" B1-Bn which may improve upon object A (or may provide processing parameters or additional information as further discussed below). It will be appreciated that there could be multiple forms for this suggestion, as discussed in more detail herein below. ML model 317 may also suggest adding an appropriate element, such as an image from an image repository in CMS 50, generated text, etc.

In stage 3 (user feedback interaction), interaction generator 315 may display object A along with suggested version(s) B1-Bn to the user, via the relevant handler 370 or 400. The user then determines or derives a version C through interaction with handler 370 or 400. This determination or derivation provides explicit feedback to system 200.

In stage 4 (further editing, interaction and site design), the user further edits the version C (if required) to create a version D which is integrated into the site S to be published by site generation system 40. This further editing provides implicit feedback to system 200. Such editing may include editing of the object itself (version C), the disposition of the object (whether or not the object was integrated into the web site and in what way), processing done on the object, information extracted from the object or other editing related to the object (even if not directly modifying it).

It will be appreciated that suggestions B may not be limited to an actual modified object (or set of objects). The output could also include, for example, a set of parameters used to process A so as to create modified object B. For example, an image enhancement task AI unit 310 may propose values for specific filters (e.g., brightness, contrast, etc.) rather than new image B itself. The user may then modify these parameters. Similarly, in an image cropping task (or various segmentation tasks), the associated AI unit 310 may provide the cropping parameters (X/Y ranges) which the user may modify, rather than providing the resulting cropped image(s).

Suggestion B may also be a set of specific editing steps (or instructions) which may be applied to object A in order to create modified object B. System 200 may allow the user to modify these steps, rather than to provide the result of their execution and per activity AI unit 310 itself may generate these steps instead of a completed solution. When handling editing steps, ML feedback-based proposal module 300 may employ machine learning models from the realm of natural language processing and natural language generation, which may provide better results on sequences of steps. Such natural language handling models may be used in addition to or instead of the regular models.

It will be appreciated that the suggestion and feedback interactions in stages 1 and 2 may take multiple forms. For example, ML feedback-based proposal module 300 may suggest B, which may be, for example, a retouched version of an image. The user may accept or reject the suggested B. The derived version C is then either B (if the change was accepted) or A (if the change was rejected).

In another example, interaction generator 315 may display B together with a set of parameters for modification or other processing of A (e.g., cropping rectangle coordinates, face-enclosing rectangles coordinates or brightness filter setting). The user may accept these parameters (and the suggested B) or may modify these parameters (e.g., move/resize the cropping rectangle) to create new version C. ML feedback-based proposal module 300 may also apply model-based generation of a series of processing steps or instructions.

ML model 317 may also suggest a modified version of A (e.g., a retouched version of an image). In this scenario, system 200 may provide a specific editor which allows the user to modify B further to create a preferred version C.

ML feedback-based proposal module 300 may also generate (and offer) multiple versions B1 to Bn from which the user may select one (to determine a version C). ML feedback-based proposal module 300 may also allow the user to reject all options (in order to generate additional options), to merge options, or to specify different version generation parameters (and re-run stage 1 to generate a new set of solutions).

ML feedback-based proposal module 300 may utilize both implicit feedback and explicit feedback, as discussed hereinabove, or only implicit feedback or only explicit feedback, as appropriate.

It will be appreciated that system 200 may also combine the feedback interaction options above allowing the user (for example) to accept, reject, or edit a given suggested solution (or set of solutions). System 200 may also provide specialized editing tools or environments which are aware of the existence of multiple "layers" (original A, suggested B and currently edited C) or multiple solutions (B1 . . . Bn). The feedback interaction tools or environment may not be limited to a simple editing environment (for image/layout editing or otherwise) and may interact with the original per activity AI unit 310 which produced B or may employ additional auxiliary models for specific feedback interaction tasks.

For example, system 200 may offer (for image-related tasks) the use of specific brushes or area marking tools which allow some parts of the suggestion B (as defined by brush shape/mask or marked area) to revert to the pre-model A values i.e. essentially an "undo brush."

Conversely, system 200 may offer similar brushes or area marking tools which may be employed on a copy of A to apply the model-suggested solution B to specific areas i.e. essentially a "redo brush." Such a brush may be useful, for example, when the user is generally unsatisfied with the proposed suggestion B, but still wants to use specific parts of B when creating C.

Similarly, system 200 may offer the option to mark specific areas of A and to activate or apply per activity AI unit 310 specifically on them. Such an option could be used, for example, in an object recognition task in which the relevant per activity AI unit 310 failed to detect objects in some areas. This option may enable the user to activate the relevant AI unit 310 on user-marked areas, which may be used in addition to or instead of the suggested solution (fully or in a specific area)—providing further hints (which serve as training information) to AI unit 310. System 200 may use the original model, may use the original model in conjunction with some specific execution parameters, or may use a different model which may be particularly suited to detecting the objects in the user-marked areas.

When reviewing multiple offered layouts, system 200 may offer tools to merge sub-areas from different models. System 200 may use a specific machine learning model for merging multiple layout elements into one coherent layout and may also use dynamic layout technology to do so, such as is described in U.S. Pat. No. 10,185,703, commonly owned by Applicant and incorporated herein by reference.

It will be appreciated that system 200 may also offer comparison tools, allowing the user, for example, to overlay two or more of the object versions (A, B or B1 . . . Bn and current C) and flip between them or otherwise visually compare them, to help him edit C.

System 200 may provide multiple different feedback interactions (or user interfaces) to different users or may provide multiple interactions with the same user. This could depend on the object itself (e.g., simple vs. complex object), on results from interaction generator 315 (i.e. the suggested solution(s)), on the user parameters (e.g., by level of experience of user, number of times the user performed this specific task, etc.), on the site parameters or on other WBS parameters.

System 200 may then re-train the per activity AI unit 310 using the pair [A, C] as an example of the desired result C based on the original object A, or using the parameters used to generate C as in the parameterized filters example above. Later, system 200 may gather additional information (including, for example, D's information, WBS information, and user activity information) and may use this information for additional training as discussed in more detail herein below.

As an alternative, instead of training existing models with additional training data, system 200 may generate new models (based on the gathered training data) and may evaluate their performance against the existing models as discussed in more detail herein below.

ML models 317 may be any suitable model for the task or activity implemented by each per activity AI unit 310. Machine learning models are known in the art and are typically some form of neural network. The term refers to the ability of systems to recognize patterns on the basis of existing algorithms and data sets to provide solution concepts. The more they are trained, the greater knowledge they develop.

ML models 317 may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DB scan), or Bayesian methods (e.g., Naïve Bayes, Bayesian model averaging, Bayesian adaptive trials), image to image models (e.g. FCN, PSPNet, U-Net) sequence to sequence models (e.g., RNNs, LSTMs, BERT, Autoencoders) or Generative models (e.g., GANs).

Alternatively, ML models 317 may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models 317 may be generative models (such as Generative Adversarial Networks or auto-encoders) to generate solution elements (such as website building system elements and media objects).

For most embodiments, ML models 317 may undergo a training or learning phase before they are released into a production or a runtime phase or may begin operation with models from existing systems or models. During a training or learning phase, ML models 317 may be tuned to focus on specific variables, to reduce error margins, or to otherwise optimize their performance. ML models 317 may initially receive input from a wide variety of data, such as website building system CMS data, site information (including components, structure, layout, formatting and other information), external information, user information, gathered editing history, gathered business information, etc.

In another embodiment and when appropriate for the particular task, one or more of ML models 317 may be implemented with rule-based systems, such as an expert system or a hybrid intelligent system which incorporates multiple AI techniques. These are discussed in the articles in the Wikipedia entitled "Rule-Based System" and "Hybrid Intelligent System", at en.wikipedia.com.

During runtime, the trained ML models 317 may provide proposals for improvements that their associated interaction generators 315 may provide to the WBS users 61 or 62. As mentioned hereinabove, at some appropriate time, ML models 317 may be updated with information from any or all of feedback handlers 370, 340, 380 or 390.

Figure 5:
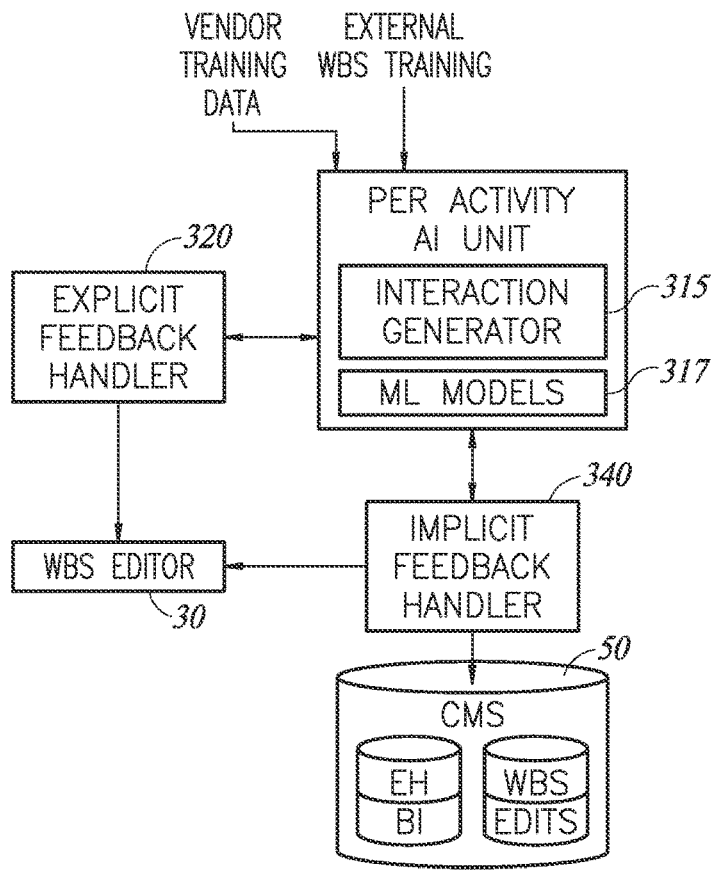
FIG. 5 is a schematic illustration of the training and continuing setup of one per activity AI unit forming part of the module of FIG. 3.

Reference is now made to FIG. 5 which illustrates the training and continuing setup of one per activity AI unit 310. As discussed herein above, each machine learning model 317 may be per activity and ML models 317 may have sub-models and may interact with each other. The models 317 may also be trained with different levels of data, such as data from all users ("universal data"), data from a community of users ("community data") or data from a single user. It will be appreciated that the existence of multiple models 317 for multiple tasks and/or for multiple groupings of users allows for multi-task learning, benefiting from an analysis of commonalities and differences between the different tasks. Furthermore, the models 317 may support each other, for example, face detection and object detection models may provide support (including via transfer learning) to an image cropping model or to portrait/object segmentation models. This interaction between the models 317 may also allow system 200 to provide supporting information or explanations to its proposed solutions, e.g., showing the underlying detected face and objects which support a given image cropping solutions, as described in more detail herein below.

Figure 6:
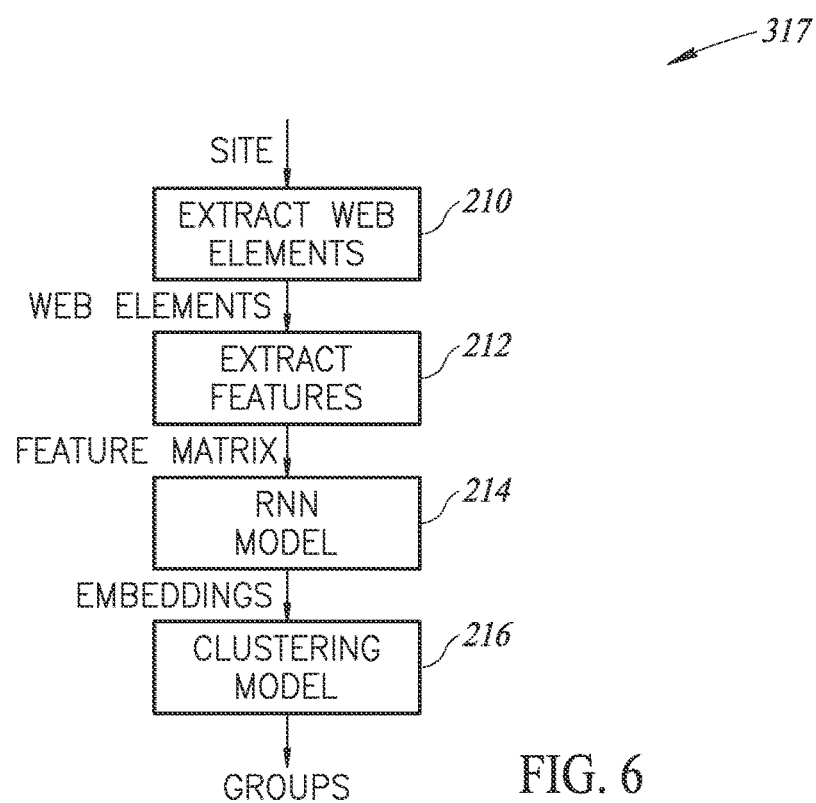
FIG. 6 is a flow chart illustration of an exemplary method implemented by one type of machine learning model forming part of the AI unit of FIG. 5, for the task of layout understanding and component grouping.

Reference is now made to FIG. 6, which illustrates an exemplary method implemented by one type of ML model 317, for the task of layout understanding and component grouping. ML model 317 of FIG. 5 may be recurrent neural network (RNN) or a long short-term memory (LSTM) based and may initially extract (step 210) web elements to be processed. In step 212, ML model 317 may extract the relevant features of the web elements or components, such as their geometric properties (position on the page, size and depth), type and other metadata (text font and size, image embedding, content (or parts thereof), links to other components, template information, editing history, associated code, etc.).

These features are then processed by a multi layered RNN/LSTM model in order to produce embeddings for each component. These embeddings are then clustered (step 214) into groups. Pages may be labelled by manually grouping elements which are required to remain together when rendering the site in a new aspect ratio (for example, mobile view) or a different target display. These labelled pages comprise the ground truth with which the ML model 317 is trained via supervised learning, in order to successfully identify groups of elements. The RNN/LSTM model is trained using a contrastive or triplet loss function, whereby the ground truth group labels are processed into an adjacency matrix (target signal) and the output embeddings of the model are used to generate a distance matrix between element pairs (predicted signal). Since each site is different, in step 216, the resultant layout definitions (or other classifications) may be clustered with a clustering model, to define the best groups to use for the site it is operating on.

It will be appreciated that system 200 may employ multiple sources of training data and feedback as is illustrated in FIG. 5 (back to which reference is now made) to support the construction and training of machine learning models for various WBS tasks. These can be used for the initial training of the models, as well as for on-going, on-line training. Training data may include explicit training by WBS vendor staff 61 (e.g. through an interactive UI) and training via mass data import (though an appropriate import interface). This importing could be from external data sources (such as an existing repository of images in CMS 50 associated with matching cropping area definitions). It could also be training data derived from existing user material within the WBS (for example images used in the WBS together with their cropping area definitions as made by the users). Implicit feedback handler 340 may provide each ML model 317 with this data as described in more detail herein below.

Initial training may also come from staff external to WBS vendor staff 61, such as hired external staff (possibly matter experts/professionals) or crowd-sourced staff (using a crowd-sourcing platform such as Amazon's Mechanical Turk).

Training may also come from existing users of the WBS through system 200, in the form of initiated interactions which request specific feedback on specific data samples as handled by explicit feedback handler 320. These may be data samples selected specifically to train the particular ML model 317. System 200 may also employ active learning techniques to select interaction strategies which provide the highest training value and implicit feedback analyzer 345 may also analyze user information and user web site information to detect the best users to query, as described in more detail herein below. It will be appreciated that implicit feedback analyzer 345 may consider the information maintained about past responsiveness, performance, and answer quality of the user. The analysis may also take into account the proficiency of the user in executing the specific task (for which the specific model is being trained for). Such a proficiency analysis could be based (for example), on an analysis of the user's website(s). Further implicit feedback may include other activities within WBS 5, such as a save/discard decision, a publish action, designer site browsing patterns, etc.

System 200 may also incentivize the user to provide feedback with monetary or other bonuses, such as a premium package upgrade for use with system or other in-system goods (e.g., enhanced web site templates, higher capacity limitations, etc.).

It will be appreciated that the abovementioned sources are in addition to the training information gathered in general by implicit feedback handler 340 and explicit feedback handler 320 as described in more detail herein below. It will be further appreciated that for the training cases discussed above, vendor staff 61 providing their training may provide additional labeling or feedback information which would not be asked for as part of a regular feedback interaction.

As discussed herein above, system 200 system may extract feedback information from additional sources besides the user feedback interaction itself, and such information may be more indicative, representative, or otherwise appropriate than the regular feedback provided by the user. This inferred feedback will be referred to as "implicit feedback" as opposed to the explicitly provided "explicit" feedback. It will further be appreciated that implicit feedback may be generated by implicit feedback handler 320 at any appropriate time, such as periodically, or whenever a user makes a change to the website, or whenever the user publishes the website, etc. Implicit feedback handler 320 may gather the changes, analyze them and then provide them to the relevant AI units 310 to update their models appropriately.

For example, system 200 may support the user when importing an image by offering an enhanced version of the image using an image enhancing ML model 317, which may provide automatic enhancing of image brightness, contrast, etc. The user may be asked if he prefers the original or the enhanced image, and the user's decision may be used to train the model.

Alternatively, system 200 may provide the user with specific editing tools to modify the applied brightness, contrast, and other changes (also known as "filters"). System 200 may provide model-based initial settings for these editing tools, and the user may modify these settings. The user-modified settings may then be used as user feedback to train image enhancing ML model 317.

However, the user may continue editing the site, and may further modify the imported image during on-going site editing. He may also re-import the original image, modify some of the parameters (e.g., through an image editor built into WBS editor 30) or even import a different image altogether (i.e., drop the original imported image). System 200 may analyze the new image and may use it to provide additional or updated training information for the relevant model 317. For example, implicit feedback analyzer 345 may analyze the level of brightness in the final modified image vs. the initial image selected (or the initial brightness value selected) and may use this information about the change in brightness to re-train image enhancing ML model 317. Implicit feedback handler 340 and its analyzer 345 may also extract additional features for training not directly related to the image content, e.g., was the image used on an important page (e.g., the site home page), a less-important page, or not at all? Similarly, implicit feedback analyzer 345 may analyze the placement of the image on the page in which it appears to determine its importance (e.g. "above the fold," "below the fold" or as an optional image). All of these may serve as model features for ML models 317.

As another example, at the appropriate time, explicit feedback analyzer 325 may process an existing page A to determine a suitable improved layout B for the page (e.g., by modifying the arrangement, sizes, and types of components). The analysis may involve reviewing the components of the selection, the multiple possible layouts (e.g. B1-B4) presented to the user and the user's final selection (e.g., B3). The user's explicit choice is the explicit feedback. Explicit feedback analyzer 325 may utilize all explicit feedback or only some of it and may also merge or summarize the changes to provide better input for retraining ML models 317.

As mentioned herein above, the user may later edit the "accepted" C version (which was B3), performing additional changes to create a later version D of the page. Implicit feedback analyzer 345 may track these later changes and may use the D version as an additional source of feedback to re-train the relevant ML model 317. If the user edits page B3 before accepting it, then explicit feedback analyzer 325 may analyze that information as implicit feedback.

It will be appreciated that implicit feedback analyzer 345 may analyze the differences between the C version of the page (the B3 version initially selected by the user) and the D version (the one finally published) and may isolate specific differences relevant to the model and the features used by it. Such an analysis could include (for example) a component difference analysis, e.g., using the differences for training changes to components which exist in B3. Such an analysis could also include attribute-specific analysis, i.e., only take into account attributes such as position and size, and not take into account other attributes. Implicit feedback analyzer 345 may then provide the results of its analysis to the relevant ML model 317 for retraining.

It will be further appreciated that such analysis can also be performed by implicit feedback analyzer 345 for other types of tasks and models available within the WBS.

Implicit feedback may also be gathered from sources external to the site, such as feedback generated for other sites of the same designer (user) or sites of similarly-situated users (e.g., professional graphical designers in Japan) as discussed in more detail herein below.

It will be further appreciated that implicit feedback may be collected at various points during the site creation workflow. It may be gathered online, i.e., immediately when the user modifies a site element whose construction involved machine learning model-based editing or it may be gathered upon a specific event, e.g., each time a handled site element is edited or replaced.

Implicit feedback may also be gathered at the end of an editing session, assuming that the user has created a more finalized version of the web page which better reflects the user's understanding. This assumption may not be correct in some cases, as the user may have ended his editing session without finalizing the page (or a given object in it), intending to continue the work in the next editing session.

It may also be gathered when the site is published as this is likely to be a "final" version of the web page and the objects in it (though sites are often published multiple times in multiple versions). For example, in the improved page layout example above, this could very well be the best point to sample the implicit changes. In this scenario, implicit feedback gathering may help train the model with the right value even if the user (for example) changes his mind.

System 200 may also gather implicit feedback for multiple tasks and models simultaneously, as a given site may contain multiple objects generated using multiple ML models 317. Further editing (which generates feedback) may involve multiple such objects.

It will be appreciated that for many types of systems and tasks, a universal ML model 317 may be applicable. This could be, for example, when the decisions made by all users in the target audience of the system are similar. An example is the classification of e-mail into spam or non-spam, which would typically be uniform for all people reviewing a given e-mail. In this situation, it would be rare for one person to classify a given e-mail as spam and another person as non-spam.

Such a model may be used for all users but may be enriched with additional model features which provide sufficient differentiation between different user categories. For example, features involving the user's language and the e-mail language may be highly relevant for spam detection, as unprompted e-mail in a language different from the user's language is very likely to be spam.

It will be appreciated that generally, for many of the tasks performed in WBS systems, the desired result is not universal. The desired result for a given user may depend heavily on local or personal preference, community-related design preferences (based for example, on the country, region, designer, professional experience/expertise, industry, etc.) For example, professional and non-professional designers often have different preferences regarding how some of the tasks (such as site design or image enhancement) are to be performed. As another example, the preferences of a designer specializing in law office websites may be vastly different from the preferences of a designer specializing in musical performance websites.

Thus, training a single universal per activity AI unit 310 (for any specific task) with the user feedback may not provide optimal results for all users, and it may be better to train separate models for communities whose preferences are completely disjoint.

However, system 200 may use a universal per activity AI unit 310, with a universal ML model 317, for some tasks. The universal AI unit 310 may use additional information available in the WBS, i.e. system 200 may train the universal ML model 317 based not just on the user's feedback but also using additional existing or analyzed WBS information (as discussed herein above in relation to implicit feedback analyzer 345). Implicit feedback analyzer 345 may also extract features based on user parameters (geography, experience, professional design status, etc.), the user's web site(s), the user activity, and additional gathered information (as available in WBS CMS 50 or otherwise). The pertinent per activity AI unit 310 would be best in handling cases that are common to all communities/users.

System 200 may also use additional multiple per-group or per-community ML models 317 for different populations (e.g., for all professional developers, for all lawyer website designers, for designer specializing in Japanese-style design, etc.). System 200 may train the pertinent ML model 317 and the relevant per-group ML model 317. The training data may include the gathered user feedback as well as additional WBS information (as described herein above). System 200 may also use personal (per user and per-task) models 317 for tasks whose solutions are highly individual.

The groups may, in fact, overlap, and thus system 200 may train multiple (group-specific) models for each given gathered feedback. Community handler 380 may initially split the training flow (i.e. send the training data to multiple models) and afterward, may unite the recommended solutions generated by the multiple ML models 317 in multiple ways, e.g., creating merged solution(s), selecting the best solution(s) of these offered by the multiple per activity AI units 310, etc. The group definitions may be unique for a given task (and its related model) or may be shared between multiple tasks.

Community handler 380 may allow the groups to be managed manually (i.e., adding and dropping group definitions and associated models as required). Community handler 380 may alternatively automatically identify sub-segments of the general population which have similar preferences (based on a separate model or other techniques such as clustering analysis). To determine which users belong to which community, community handler 380 may infer a user profile of a particular user from the user's editing history and/or information about the user's website. The user profile may also include business intelligence about the user's website. For example, an art web site accessed mostly from Japan is most likely (though not necessarily) to be for Japanese-style art.

Community handler 380 may also expose some group definitions to the user community and may furthermore allow a user to declare his affiliation with one or more groups. For example, system 200 may support a "Baroque design style" group (with an associated per activity AI unit 310) and may allow users who desire Baroque design style recommendations to join this group. In addition, community handler 380 may avoid exposing some groups, e.g. "professional user" and "non-professional user" groups which are automatically assigned to the user based on a declared status or analysis of the user's sites.

As discussed herein above, the integration of feedback into the workflow of the WBS improves the probability of the user providing feedback to a specific model and improves the quality of the provided feedback. This improvement results from the integration of either explicit or implicit feedback.

In particular, for some tasks, the feedback interaction may be sufficiently integrated with the WBS workflow so that the user provides the feedback transparently when executing the task (e.g., by accepting or rejecting an offered solution). Thus, the response rate to such a feedback interaction is likely to be as close to 100% as possible, and the user is likely to provide a correct response (for the user's preferences and knowledge at that time).

However, in some cases, users may fail to provide feedback or may provide incorrect feedback. For example, with an image enhancement task in which the relevant ML model 317 may provide the initial setting for image filters, the user may select junk values (e.g., with filter parameters having a value range of 0 . . . 100, setting all values to close to 0 or close to 100). As another example, in an object detection or segmentation task, the user may mark areas which do not include relevant objects (or any objects at all).

Such a failure to provide feedback could be a localized problem with the specific task, or a repeat problem with some users, e.g., some users are "repeat offenders" which most of the time do not provide useful feedback (due to disinterest, lack of understanding, negligence or any other reason). As an example, a user may have (for some reason) a strong preference to "do my own thing." Such a user may disqualify multiple model suggestions B1 to Bn by rating every suggestion as a bad one. Alternatively, such a user may provide an arbitrary low-quality or wrong feedback (e.g., mark face segmentation cropping rectangles which do not contain faces at all). The user may then proceed to use a separate version of the object in question, which may or may not be similar to any of the suggested Bn solutions.

In such cases, system 200 should detect such users, and generally use the implicit feedback (gathered from their sites) instead of using their explicit feedback, possibly ignoring their (incorrect) explicit feedback altogether.

The problem may be more substantial in cases in which the output of ML model 317 and the desired feedback do not visibly contribute to objects in the edited website. For example, an embodiment of system 200 may include a face detection model which is used for internal purposes (e.g., as input to other models such as determining regions of interest in images in an image cropping model) but may not directly affect objects in the edited website. System 200 may still collect feedback for the face detection model, e.g., by detecting faces in imported images and asking the user to correct the detected face rectangles in these images. In such cases, users are more likely to provide incorrect or low-quality feedback without this visibly harming their web site.

The problem may also occur if ML feedback-based proposal module 300 asks for feedback about data/objects not related to actual user tasks, e.g., when ML feedback-based proposal module 300 initiates a feedback interaction on non-task data as part of an active learning system. In such a scenario, ML feedback-based proposal module 300 may be unable to gather implicit feedback at all and may only be able to use the (possibly ineffective or otherwise incorrect) explicit feedback. ML feedback-based proposal module 300 may also handle such cases of missing or faulty feedback by using one or more auxiliary models. For example, one or both of explicit feedback analyzer 325 and per activity AI units 310 may use a response evaluator 330 and/or a user evaluator 332, forming part of feedback system 305, as described in more detail herein below. These units may evaluate the quality of feedback responses and of the users (respectively). For example, response evaluator 330 may analyze the quality and relevance of the responses from a given user. Theoretically, a given user may provide excellent feedback regarding photo retouching (if he's a professional photographer) but may provide low-quality/incorrect feedback for layout-related issue (if he's a very bad graphic designer).

Response evaluator 330 may compare the feedback of the user with feedback provided by other, similarly situated users (e.g. determined though clustering analysis). If the user feedback is "extremely far from the other clusters", then the user may be defined as being an undesired outlier. Response evaluator 330 may also search for whether or not the user uses extreme values in settings where these values do not make sense (e.g., setting brightness to 100% in photo retouching parameters). Similarly, response evaluator 330 may review output based on the user's settings/definitions. If the output is evaluated as very bad using an external (supposedly objective) evaluator, such as the layout quality rater 47 described in U.S. Pat. No. 9,747,258, entitled "System and Method for the Creation and use of Visually-Diverse High-Quality Dynamic Layouts", granted 29 Aug. 2017, commonly owned by the Applicant and incorporated herein by reference, then the user may be defined as an outlier.

User evaluator 332 may utilize similar types of analyses, but on previous answers of the same user, rather than in comparison to a group or community of users.

It will be appreciated that both evaluators 330 and 332 may take into account the user feedback and its quality (both explicit and implicit). Additional features may be derived through specific analysis and rules, looking for bad responses such as responses using boundary value filter settings or having user-specified face detection rectangles which do not contain a face image (as discussed herein above).

It will be further appreciated that both evaluators 330 and 332 may also take into account other parameters, such as the history of user responses, user rating (pro designer vs. regular), user skill level, the complexity of the user's sites, user parameters (geography, etc.) or site parameters. In particular, the evaluators 330 and 332 may evaluate a user response/feedback against the user's choices or final site version (the "C" and "D" level versions above) in the previous use of the same task (e.g., is the current user feedback consistent with past feedback to the same task?).

In one embodiment, both evaluators 330 and 332 may also use human evaluation (labeling) or some or all of the feedback, e.g., through interaction with WBS vendor staff 61 or crowd-sourced evaluators. Such human labeling may be useful, for example, for initial training of the auxiliary models.

It will be appreciated that these auxiliary evaluators 330 and 332 may also evaluate the users' skill level as related to the specific task, to related tasks, to site design in general (e.g., how good are the websites created by this designer) or other factors and features extracted from the WBS information. As discussed herein above, "quality" and "skill" are not absolute measures, as the "best" results for a given task may depend on the user community, culture, skill level, etc.

Both evaluators 330 and 332 may also evaluate "soft" parameters of the interaction. Such parameters may include the time it took the user to answer, the level of certainty in answer (e.g. did the user select an answer and then change it before pressing "OK"), and/or biometric parameters of the interaction (such as mouse motions, hand motions, eye motion, measurable biometric/biological user parameters or other parameters).

As discussed herein above, explicit feedback analyzer 325 or per activity AI unit 310 may apply response evaluator 330 to evaluate the user's feedback (for validity, correctness, etc.) and to determine if and how the response should be used (e.g. for training), if at all. Response evaluator 330 may use the feedback rating to disqualify feedback data whose rating is below a certain threshold. Response evaluator 330 may also use the rating to assign weights to specific training data samples (i.e., user feedbacks) when working with underlying models which support such weight assignment.

User evaluator 332 may evaluate the users themselves to provide an on-going evaluation if the user is likely to provide useful feedback or not. Per activity AI unit 310 may activate response evaluator 332 before entering the feedback interaction in order to determine which feedback interaction to provide, or possibly to not provide a feedback interaction or a model solution (e.g., for users who consistently reject the solutions offered by a specific model).

It will be appreciated that, since system 200 trains its ML models 317 with user feedback, models 317 should generally follow changes in user preferences and taste. However, system 200 may detect that the user feedback (both explicit and implicit) may reflect a growing loss of precision in the solutions generated by the ML models 317 (requiring users to implement more significant changes to the suggested solutions B in order to get their desired result). It may also be detected when users consistently reject suggested results, even without editing these results.

Such loss of precision could result from a combination of errors introduced into ML feedback-based proposal module 300 during design and development, changes in a specific user group or segment preferences and tastes and general changes in the user's preferences and tastes (including changes which require analysis of features not previously provided to per activity AI unit 310). Such general changes are known as a concept drift.

As discussed herein above, the model results may depend on the classification of users into groups or segments, and the specific preferences of each group by community handler 380. However, both the specific group preferences and the correct assignment of users into groups may change over time.

The per activity AI units 310 may be able to correct some of the above over time. However, some problems (such as implementation bugs) may not self-correct. In particular, the per activity AI units 310 cannot detect and handle cases in which the feature definition they use needs to be changed (such as whether a specific feature definition should be modified, or a new feature should be created).

An example of this is a user community that over time gets divided into multiple subpopulations with very different preferences for some tasks. If a new feature needs to be added that distinguishes between these multiple sub-populations, the specific per activity AI unit 310 may not be able to recommend such a change or define such a new feature by itself.

Vendor feedback handler 390 (FIG. 3) may resolve all of the above through reporting of key metrics and performance from system 200 to the staff of WBS vendor 61. Such reports may provide the required feedback to the staff of WBS vendor and may allow them to initiate a human-guided corrective action as required. Vendor feedback handler 390 may also provide additional information to WBS vendor 61, such as alerts and statistics (possibly including user/site/object information related to the specific issue).

As discussed herein above, ML feedback-based proposal module 300 may also use the feedback interaction as part of the tasks connected with editing. It will be appreciated that there are some application areas which are centered on the handling of a single object/component (such as an image) only and on additional objects associated with the single object (such as cropping rectangle definition or product descriptors for products identified in an image).

For some of the tasks, there may be specific per activity AI units 310 and implicit feedback gathering techniques, though the feedback gathering techniques already described above (e.g., based on the positioning of the generated image in the site) may all be relevant to each of the application areas as described herein below.

Figure 7:
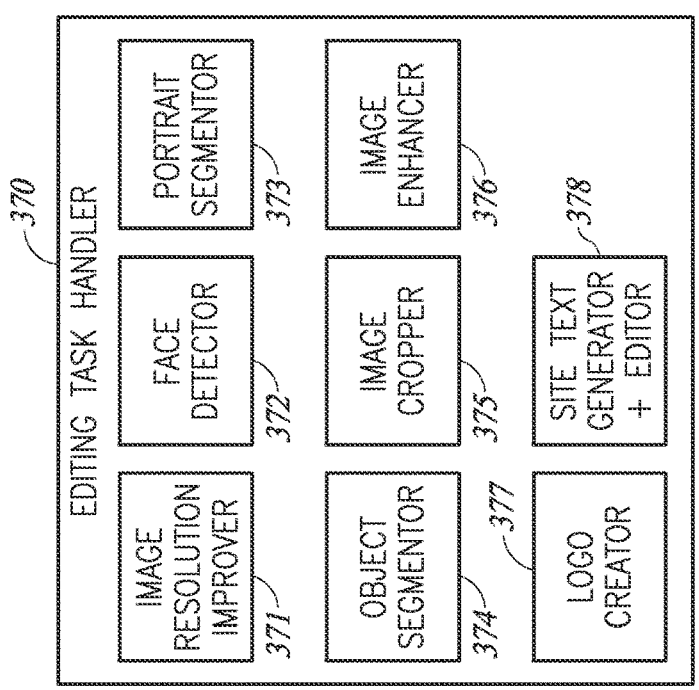
FIG. 7 is a schematic illustration of the elements of an editing task handler forming part of the module of FIG. 3.

Editing task handler 370 (FIG. 3) may utilize this gathered information accordingly to improve editing tasks as supplied by WBS editor 30. Reference is now made to FIG. 7, which illustrates the elements of editing task handler 370. Editing task handler 370 may comprise an image resolution improver 371, a face detector 372, a portrait segmentor 373, an object segmentor 374, an image cropper 375, an image enhancer 376, a logo creator 377 and a site text generator and editor 378. It will be appreciated that each element of editing task handler 370 may operate with its own per activity AI unit 310 within ML feedback-based proposal module 300 and may utilize both explicit and implicit feedback information.

It will be appreciated that when users upload small images to large components containing them, the images may become pixelated and noisy. To resolve this problem, image resolution improver 371 may employ a super resolution AI unit 310 to upscale the pixels of images to create a smooth, un-pixelated result, once enlarged. Image improver 371 may also combine elements of de-blocking and upscaling.

Image resolution improver 371 may activate the super resolution AI unit 310 under a number of conditions, such as on import, whenever the container is resized while editing the page, or when image resolution improver 371 detects resolution differences (e.g., when the required resolution is significantly larger than the input resolution, e.g. x4 larger).

It will be appreciated that image resolution improver 371 may use multiple feedback interactions such as any of the following actions or a combination thereof. Image resolution improver 317 may display the original image with a set of one or more model-generated images and may allow the user to select which one to use. These multiple images may be generated by multiple per activity AI units 310, multiple algorithms, and multiple settings for specific models/algorithms. Image resolution improver 371 may also display a model-generated image and may allow the user to edit it, coordinating with explicit feedback handler 320 accordingly.

It will be appreciated that for implicit feedback, image resolution improver 371 may use a later version of the image (e.g., from a later version of the site or in the published version). System 200 may limit such usage to cases in which the user has further modified the image after the initial feedback interaction. Image resolution improver 371 may also use additional sources of information for the model(s), such as the image placement, user parameters, and image editing history (as described herein above) coordinating with implicit feedback handler 340 accordingly.

Face detector 372 may recognize the appearance of one or more faces in a given image. Face detector 372 may only perform detection only, or may also include face recognition (i.e., determining the identities for detected face images). In this scenario, a face detection AI unit 310 may produce frames (e.g., rectangles) enclosing the detected face(s), but may also produce additional information (such as a more precise enclosing curve or polygon).

It will be appreciated that the feedback interactions for face detector 372 may allow the user to approve, decline, or edit the frames enclosing the detected faces via explicit feedback handler 320. The editing may include allowing the user to move/resize a frame to correct the detection, as well as the ability to remove frames or add new frames (i.e., manually identify additional faces).

One problem with face detection AI unit 310 is that the detected faces are not always directly used in the page editing process (thus reducing the quality of the feedback). As discussed herein above, system 200 may use an auxiliary ML model 317 to confirm that the marked areas (e.g., as modified by the user) do contain faces, so that bad feedback can be disqualified. Alternatively, or in addition, ML model 317 may utilize implicit or explicit feedback gathered in a follow-up operation to determine if the user clipped or cropped the image according to the face rectangles.

The output of face detector 372 may be typically used as input to image cropper 375, described in more detail herein below. The output may also be used as an indicator for redirection to portrait segmentor 373, discussed in more detail herein below, if face detector 372 detects a face with a probability above a minimum threshold.

Portrait segmentor 373 may remove the background from portrait images and may help users create homogeneous images containing multiple portraits. Such images may be needed for web site sections such as "our team" which may be part of a manually edited site or of an automatically generated site. In this scenario, a portrait segmentor AI unit 310 may be trained to distinguish the person from the background, including handling of full-body images. The portrait segmentor AI unit 310 may produce an enclosing frame (rectangle) or a more precise enclosing curve/polygon.

It will be appreciated that portrait segmentor 373 may comprise an editing tool which allows the user to define or edit the segmentation boundary. Such a tool may allow the user (for example) to use a brush to clean up areas of the picture so that only what is not brushed is the foreground portrait. The tool may also allow the user to interact directly with the segmentation polygon, moving/inserting/deleting nodes of the polygon. It will be appreciated that this tool may provide feedback interaction.

Portrait segmentor 373 may then process the detected portraits and the remaining parts of the image (the "background") in multiple ways such as by graying out the existing background so as to make the portraits stand out when viewed, replacing the background (similar to video blue-screen) with a simpler one, such as a uniform color, a simple gradient or pattern, etc., and/or by locating a matching image for use as an alternative background. An auxiliary background image selection AI unit 310 may be trained to select such images based on the layout of the detected portraits, the user preferences, and other elements of the user's site. In particular, the suggested pictures may be selected to match the positioning of the portraits in the original image. Portrait segmentor 373 may offer multiple such potential background images for selection.

Portrait segmentor 373 may also provide tools allowing the user to edit the new combined [image+portraits], or to change the background image or pattern. These may be part of explicit user feedback or follow-up editing during regular site editing (providing additional implicit feedback). This feedback may be used to train the primary portrait recognition AI unit 310, as well as an auxiliary background image selection AI unit 310.

Object segmentor 374 may have similar functionality to portrait segmentor 373 and may be integrated with an e-commerce system which could be a part of the WBS or otherwise operating with the WBS.

Object segmentor 374 may recognize multiple object types (possibly using multiple specialized object segmentation AI units 310 for different object classes). Such recognition may be made at multiple levels, such as recognizing the outline of the object, recognizing an object type (e.g., a T-shirt), recognizing the specific object (a T-shirt made by vendor X) or specific attributes of the object (an M-size blue-white T-shirt of series Y). Such recognition may also require a catalog of objects and attributes for specific object identification and attribute detection.

The detection may be automated, or may be assisted by the user (e.g., with the user pointing at specific objects to be recognized, or by providing an approximate outline as a starting point for the detection) and object segmentor 374 may be used to directly populate product pages, including multiple fields in a given product page.

For object segmentor 374, the feedback process may include the interactions as described for portrait segmentor 373 (such as changing the segmentation definition), as well as feedback provided by the user identifying objects or specifying attribute values and tags. Additional feedback may be generated by edits made by the user to generated product pages.

Image cropper 375 may provide the automatic cropping of images, selecting the "important" or "interesting" part of the image for use in an edited page. It will be appreciated that these concepts (important/interesting) may be subjectively defined, and image cropper 375 may implement user-specific, image cropping AI units 310 in addition to a general universal image cropping AI unit 310. Image cropper 375 may also utilize image cropping AI units 310 which are specific to industries or other sub-groups. For example, for urban street images, the sub-area importance rating for a fashion design web site may be completely different from that used for traffic planning web site.

Image cropper 375 may create a "heat map" of the image and may suggest the best cropping rectangle(s) for it based on the main focal points and objects in the picture. The image cropper AI unit 310 may use inputs from other AI units 310 as described herein above, for face detection, portrait segmentation, and object segmentation (including identification of object types and selection of objects which are more relevant or important). The image cropper AI unit 310 may display the inputs from these supporting AI units 310 (e.g., displaying rectangles enclosing rectangles around detected faces) as part of the image cropping preview (described in more detail herein below) in order to help the user in his decisions and feedback.

The image cropper AI unit 310 (and some of the underlying supporting models) may also take into account the expected use for the cropped image (in a manually edited site or an automatically generated site). This could be, for example, information related to the design and layout of the target page or information related to the e-commerce product page containing the final image.

The image cropper AI unit 310 may generate multiple possible regions. This may enable the user to select the best region to use or to support systems and scenarios which support multiple cropped sub-images (e.g., by creating a multi-image gallery component from the multiple cropped sub-images). Even in this latter scenario, the user may still want to select a subset of the multiple proposed regions to use. Multi-region solutions may also be relevant in the context of site generation systems which can use multiple (and possible interrelated) parts of the image in a different position in a suggested layout.

Image cropper 375 may display a preview of the cropping options in context, e.g., inside a specific product page which contains the cropped image and may allow feedback interaction (and editing) to occur within this preview.

For feedback interaction, image cropper 375 may display a preview of the image together with the suggested cropping rectangle(s). The display may be stand-alone or made in context, e.g., inside the e-commerce product page which will contain the cropped image (showing multiple versions of the page) and may allow feedback interaction (and editing) to occur within this preview. Image cropper 375 may then allow the user to move or resize the suggested frames, select the specific frame(s), add frames or remove frames.

Image cropper 375 may later collect follow-up (i.e. implicit) feedback based on the actual use of the images and on any changes made to its zooming and cropping when the user edited the page.

Image cropper 375 may also collect feedback from users who manually place WBS elements (e.g., text or small images) overlapping areas of an image used as a background. In this scenario, image cropper 375 may infer that the overlapped areas are the less important ones and may use this information to train its image cropping model 317. Such feedback could be collected from images cropped by image cropper 375, but also from images cropped manually outside of system 200 (or not cropped at all). Such feedback could serve as a source for large-scale initial supervised learning for the image cropper AI unit 310 even before an automatic cropping facility is made available to users.

It will be appreciated that multiple users may handle the same image (or very similar images) differently, e.g., selecting different areas of the image on which to place other things. This could be arbitrary to some extent (e.g., due to different users having different priorities or taste) or related to various parameters or the users or work scenario. Image cropper 375 may provide specific parameters or the user/scenario as additional features for the training of the learning algorithm.

It will be further appreciated that the image cropping AI unit 310 may also be used outside the realm of regular image cropping. For example, site generation system 40 (as described herein above) may utilize the image cropping AI unit 310 when selecting which layout elements should overlap an image. Thus, image cropping AI unit 310 may perform initial analysis to determine the important and non-important areas of a background image. The results of this analysis may be provided to site generation system 40, and used to determine which layout elements to use when generating a site, and where to place them (e.g., so they overlap the less important part of the background images). Alternatively, an image cropping AI unit 310 model may be integrated with a ML model or rule-based engine used by site generation system 40 (so the cropping analysis and the site generation are performed together).

Image enhancer 376 may give users the option to improve their images by (as an example) automatically changing the brightness, contrast, saturation and other properties of their images. Generally, the user interface of WBS editor 30 may allow the user to specify values for brightness, contrast, saturation, sharpness, etc. via multiple levers, rotating buttons, etc. Image enhancer 376 may offer an "auto" option (for each setting, a combination of settings or all setting together) and may allow the user to correct the generated/modified settings, either during the initial import of the image or during regular page or image editing (e.g., as a pop-up user interface (UI)).

It will be appreciated that the user feedback gathered for image enhancer 376 may be based on the changes the user makes to the various settings. Image enhancer 376 may train (for example) an image enhancement AI unit 310 based on user changes at any time, such as when using auto settings or when using manual settings. Image enhancer 376 may also omit boundary values of user settings from the training data when these values are plainly wrong (such as 100% brightness), or as determined by user evaluation model 332.

It will be appreciated that for image enhancer 376, interaction generator 315 may provide suggested settings for the various scenarios. Alternatively, it may modify the underlying image directly.

Logo creator 377 may provide automatically generated logo suggestions to site creators. Logo creator 377 may utilize a logo creation AI unit 310 to create logos based on information (text, images, etc.) known about the user, e.g., from information gathered by site generation system 40 and based on user responses, analysis and gathered information from internal and external sources. This information could include, for example, the business name, slogan, picture associated with the business, an existing off-line logo or a logo used in an existing non-WBS site. The logo suggestion may thus include text (with specific font, size, and other parameters), pictures, graphics art, etc. The generated logo may combine multiple such elements.

Logo creator 377 may typically generate multiple suggestions and may allow the user to rate them. This could be done, for example, by rating each suggestion separately or (preferably) rating pairs of suggestions one against the other (i.e., which one in the pair looks better). These ratings and the final choice made by the user may then be used to train the logo creation per activity AI unit 310.

It will be appreciated that there may be differences between the scores provided by designers and those provided by users. Thus, the data and training provided by actual users may be more representative than initial training by professional designers.

Site text generator and editor 378 may comprise a text generation AI unit 310 which may provide a structured generation and editing environment for media and text elements embedded in components in the site. An example is a video editing environment which provides a set of recommended video segments, along with a tool to modify the segments, embed information in the segments, concatenate the segments, add video effects and transitions etc. A further example may be an audio editing environment, offering similar capabilities when handling audio segments.

A further example may be a structured text editing environment similar to the one described in U.S. Pat. No. 10,796,075 entitled "System And Method For The Generation and Editing of Text Content in Website Building Systems", granted Oct. 6, 2020, commonly owned by the Applicant and incorporated herein by reference. Such an environment may provide a set of text elements or "mini templates" which can "work together" in order to form text elements. These can be used to edit site text sections such as "about us", "our products", "terms of use", team biographies, specific product descriptions, etc. The "mini templates" may contain placeholders which may be filled using the information available to the system (such as the site's business name, address or product list, or other details available to the site generation system 40 or in an underlying database).

Site text generator and editor 378 may also comprise a specialized editor to provide image creation based on a set of suggested picture or video elements (e.g. cartoon character images and backgrounds) and manipulation operations. The modification and embedding operations may be provided at a number of levels such as: simple—add voice over or captions to video segments, intermediate—modify text, audio and sub-images viewed inside a video segment (as is sometimes done when translating a video from one language to another) and complex—actually specifying elements of movement and behavior for characters and objects in a video segment, and creating a parameterized video segment.

Site text generator and editor 378 may gather feedback from multiple users' activity in creating and editing these segments. The gathered feedback (and training data) may further include user features. For example, users in one region may have different preferences compared to users in other regions.

Based on the gathered feedback, site text generator and editor 378 (together with its text generator and editor AI unit 310) may then determine what material and options to offer the user (e.g., which text templates or segments, which video sub-segments, which operations to suggest, etc.) and may filter and/or rank the possible options. It will be appreciated that generally for implicit feedback, system 200 may use feedback information gathered by a follow-up activity AI unit 310, such as the image cropping or portrait segmentation models as discussed herein above.

As discussed herein above, editing task handler 370 and its elements may provide support to tasks handling a single object. This functionality may be used to support processes which may have been previously performed using specialized rule engines employing predefined sets of rules generated from a study of the problem domain. These rules may be difficult to construct and even more difficult to maintain. It will be further appreciated that system 200 may use its machine learning based solutions instead of rule engines or may combine the two technologies, integrating output from both sources. For example, an AI-based method may detect groups of web-elements and a rule-based method may then determine how to lay them in a mobile view based on their various parameters.

Furthermore, system 200 may use an existing rule-based system to provide initial supervised training to an underlying per activity AI unit 310. Such initial training could be performed by using existing outputs of the rule engine (e.g., existing site analysis and site transformation results), as well as using the rule engine on gathered sites (e.g., other unprocessed WBS/non-WBS sites as well as randomly generated ones).

Editing task handler 370 may also provide the user with specific editing or mark-up tools which may allow the user to review or edit the source material to be processed (analyzed or transformed). Such tools may allow the user to provide additional hints or associated information which may provide additional inputs to the rule-based system or the ML models 317.

It will be appreciated that editing task handler 370 may operate ML feedback-based proposal module 300 to improve analysis of the existing WBS information, typically focusing on the layout and other information on the currently edited page. Such analyses may result in the creation and modification of an auxiliary structure (such as definitions of a grouping of components or a higher-level layout description) but do not typically affect the directly visible site page.

The different analyses may use multiple features extracted from the layout and the components, including features reflecting the results of semantic analyses or other analysis types (e.g., as per the types of analysis detailed in U.S. Pat. No. 10,176,154 entitled "System and Method for Automated Conversion of Interactive Sites and Applications to Support Mobile and Other Display Environments" granted 8 Jan. 2019 and in US Patent Publication No. 2018/0032626 entitled "System and Method for Implementing Containers Which Extract and Apply Semantic Page Knowledge", published 1 Feb. 2018, both of which are commonly owned by the Applicant and incorporated herein by reference.

Figure 8:
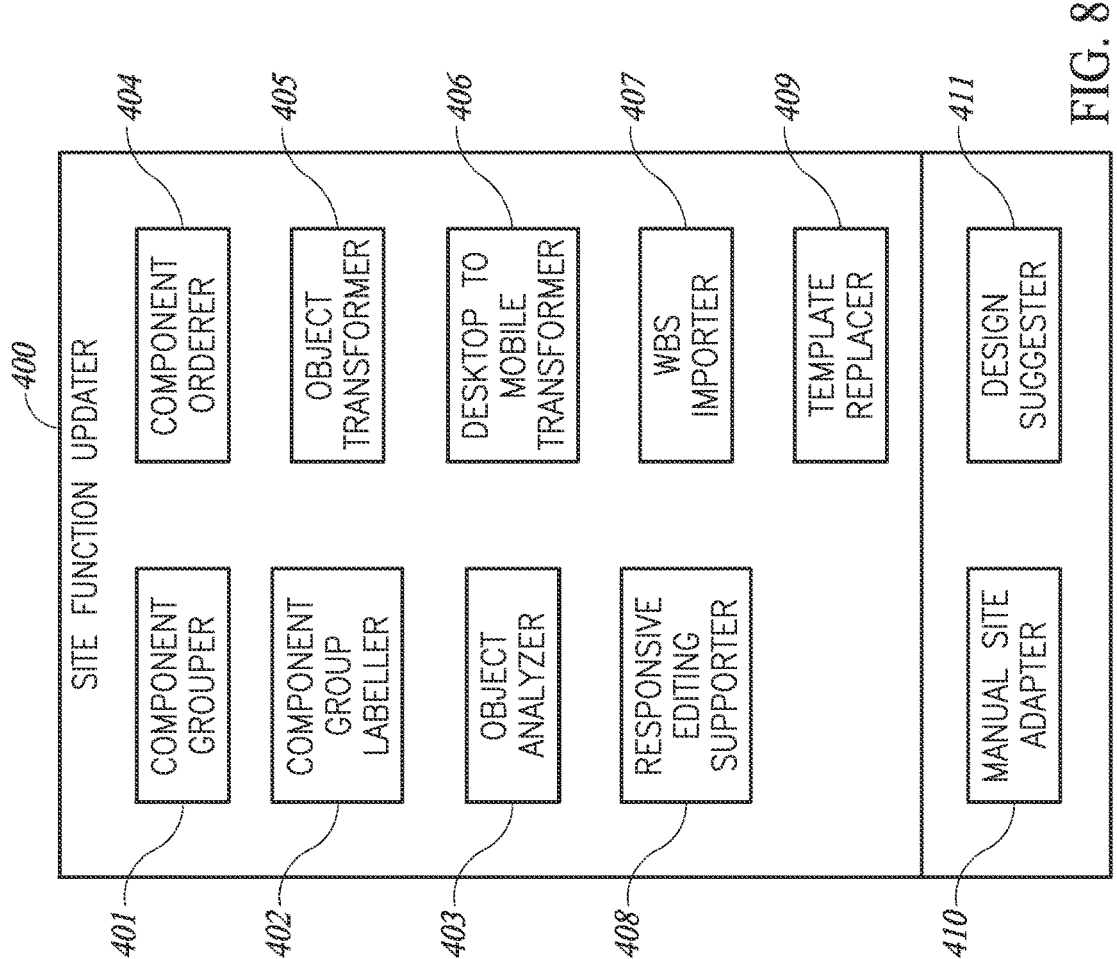
FIG. 8 is a schematic illustration of the elements of a site function updater forming part of the module of FIG. 3.

Reference is now made to FIG. 8 which illustrates the elements of site function updater 400 which may provide support to tasks handling multiple WBS components together. Site function updater 400 may comprise a component grouper 401, a component group labeler 402, an object analyzer 403, a component orderer 404, an object transformer 405, a desktop to mobile transformer 406, a WBS importer 407, a responsive editing supporter 408, a template replacer 409, a manual site adapter 410, and a design suggester 411.

It will be appreciated that, like editing task handler 370, the elements of site function updater 400 may each operate with their associated per activity AI unit 310 of ML feedback-based proposal module 300. Each per activity AI unit 310 may be universal, per a predetermined community or per user. The elements of site function updater 400 may use ML models 317 adapted to natural language understanding, with the WBS components as the symbols fed into the models. Such symbols may be directly generated by the WBS or may be the result of an underlying analysis to identify the layout and the components in a non-WBS web site (e.g., when analyzing non-WBS sites which are to be imported into the WBS, or are otherwise to be analyzed for extracted information). Such language-related models may include, for example, RNN (Recurrent Neural Network) and similar machine learning models.

It will also be appreciated that language-related models typically handle information as a series of input symbols, which is inherently one dimensional. On the other hand, the typical web page structure is two-dimensional and can be considered three dimensional when taking the display order z coordinates into account. The web page structure may be even more complex, particularly if the container hierarchy needs to be analyzed.

Elements of site function updater 400 may use algorithms to determine the "natural order" of the elements in the layout, thereby converting the 3D+ layout data into a 1D symbols series. Such an algorithm may be similar to that described in the definitions of the super-node creator and orderer in U.S. Pat. No. 10,176,154.

It will be appreciated that ML feedback-based proposal module 300 may include attributes of the original component as features of the generated sequential symbols handled by per activity AI unit 310. Such attributes may include geometrical attributes (such as the original X/Y coordinates, the height, and width of the components and its z-order) as well as other attributes of the components.

It will also be appreciated that each element of site function updater 400 may allow the user to provide explicit or implicit feedback (as described herein above). For example, in a component grouping analysis task, the users may provide initial labeling of groups, and may further provide labeling of the generated analysis (such as component grouping) as to which is wrong or non-optimal.

It will also be appreciated that the analysis tasks provided by site function updater 400 may be standalone tasks but may also be the first stage in a transformation task as described in more detail herein below.

One such task is component grouping. Similar to the system described in US Patent Publication No. 2018/0032626, component grouper 401 may support persistent grouping of objects and may offer multiple capabilities based on such groupings, such as specialized behavior for editing operations (e.g., resizing and sub-element insertion, deletion, or editing) or specialized connections to underlying data repositories.

Component grouper 401 may utilize a component grouper AI unit 310 to detect such groups and understand their layout and may utilize a ML model 317 similar to that shown in FIG. 6. The result of such detection is a definition of the component grouping which may be "flat" (i.e., consist of a single set of group definitions) or hierarchical (i.e. consist of a hierarchy of groups and super groups).

Figure 9B:
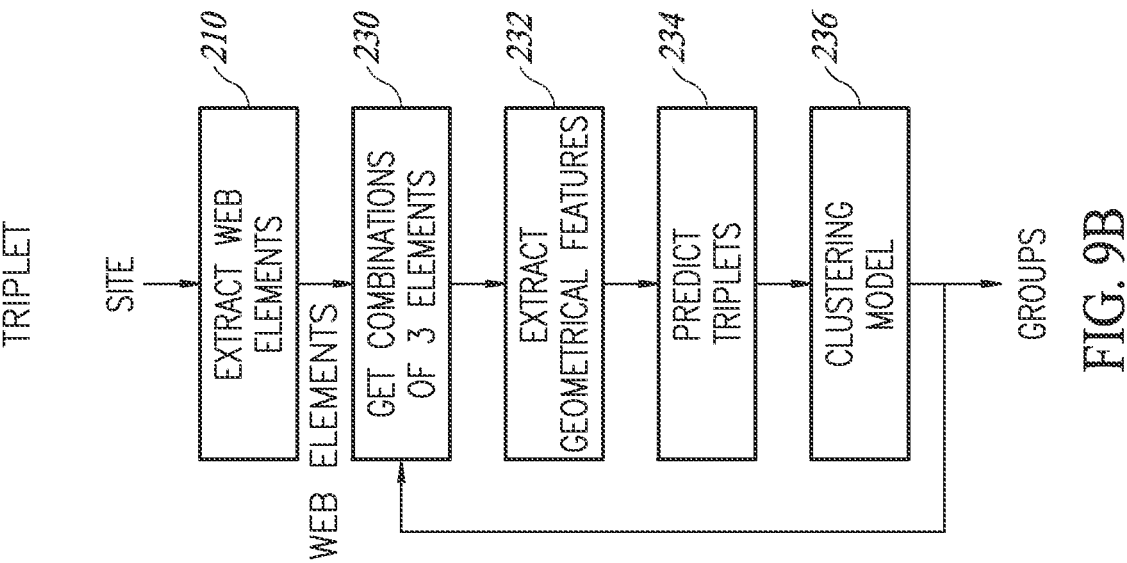
FIGS. 9A, 9B and 9C are flowchart illustrations of alternative methods for component grouping using ML models based on computer vision, based on triplet analysis, and based on a combination of triplet analysis and computer vision, respectively.
Figure 9A:
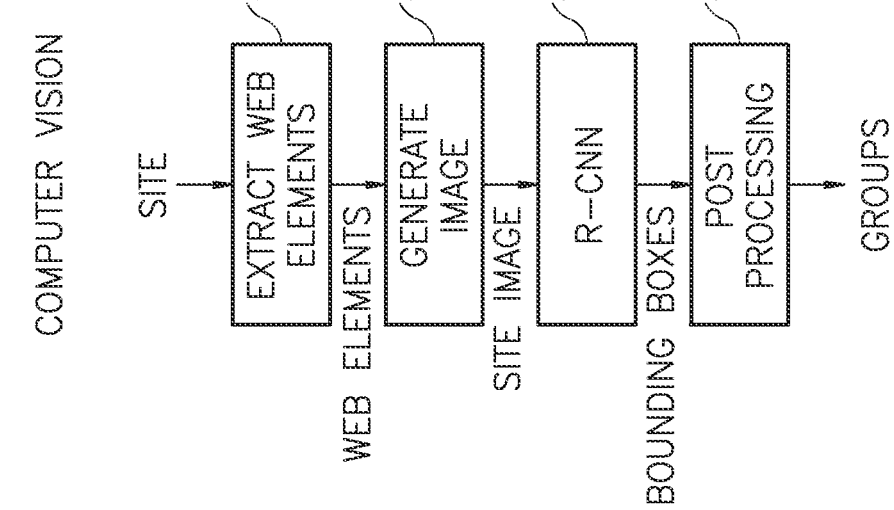
Figure 9C:
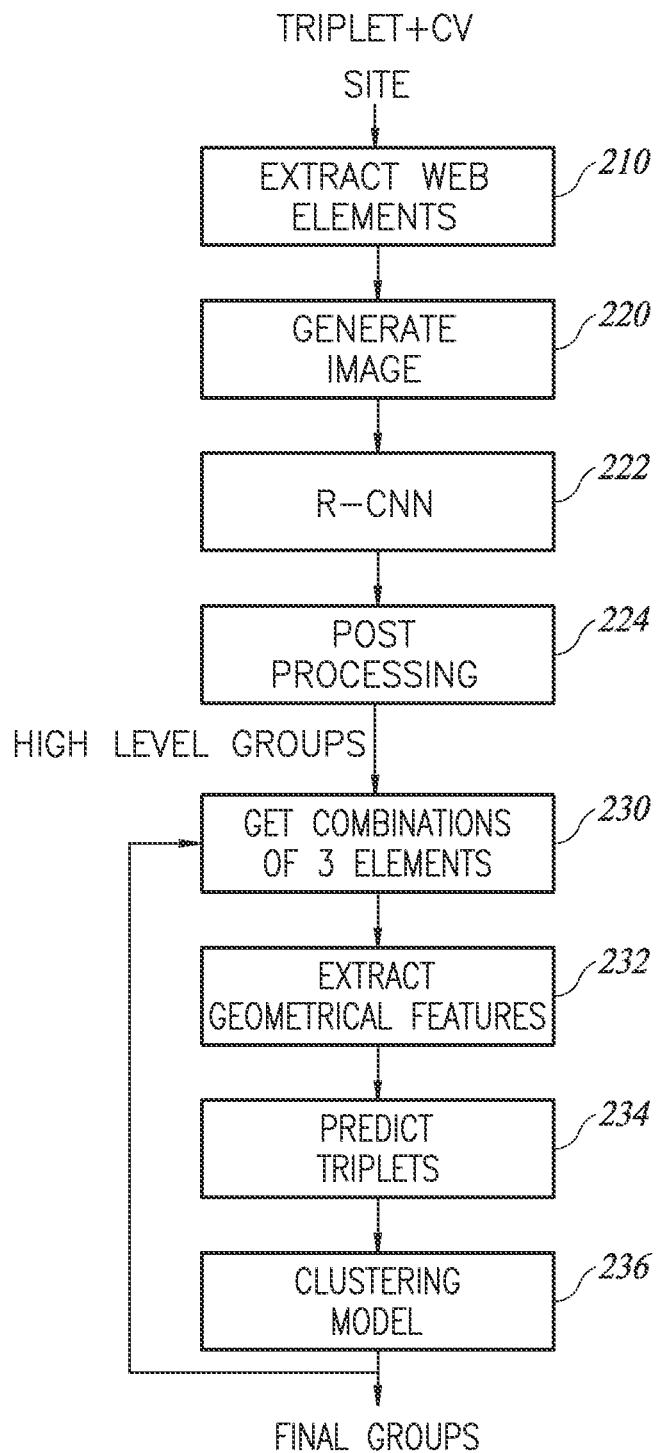

Reference is now made to FIGS. 9A, 9B and 9C, which illustrate alternative methods for component grouper 401 using ML models based on computer vision, based on triplet analysis, and based on a combination of triplet analysis and computer vision, respectively. Each process may start with extracting (step 210) web elements, as in the method of FIG. 6.

For computer vision model, the method may continue in FIG. 9A with generating (step 220) an image of the page containing the extracted web elements and may provide the resultant site image to a trained object detection neural network. For the training, each page may be rendered as an image, whereby each element type is given a color, and bounding boxes are manually drawn around each element. The model learns (step 222) to draw bounding boxes around groups of elements. This is analogous to the way an image object detector is trained to draw bounding boxes around objects in an image. These bounding boxes indicate the groups of elements and hence no further clustering is required. These images are then used to train the neural network via supervised learning (bounding box regression). The trained neural network may then produce (step 222) a set of bounding boxes (for potential groups) around the elements of the page which may then be processed (step 224) into component groups, as described in more detail herein below. It will be appreciated that the training input may comprise site images and their associated group definitions. The model in FIG. 9B is termed the Triplet Model and involves training a model to classify groups of three elements into one of three categories: 1) All elements are in the same group, 2) all elements are in different groups or 3) two of the three elements are in the same group (step 234). The model uses relational geometric features (for example distance, overlap, intersection, union) between the elements in order to classify the triplets. These features are extracted in step 232. Once all the triplets are classified, the groups are reconstructed in postprocessing by clustering elements which are most often classified as belonging together, using DBScan clustering (step 236).

The computer vision and triplet methods may be combined, as shown in FIG. 9C. Initially, the computer vision operation of FIG. 9A may be utilized and its groups may be provided as input to the triplet method of FIG. 9B. This may provide more accurate grouping of elements. The combination of the two methods enables the computer vision model to identify high level groups and implements the triplet model on each high-level group in order to find better lower level groups within the high-level groups.

FIG. 9C may be implemented on a specific container and recursively for each component node within the containment hierarchy, usually starting with the page as the top node. For each node (e.g. a container which has X sub-elements inside it), the step 230 creates each possible triplet from these X elements (i.e. $(_3^X)=X!/((X-3)!*3!)$ triplets would be created). These are analyzed as above to figure out the best grouping. Finally, the information is merged "flowing up the tree".

Figure 10:
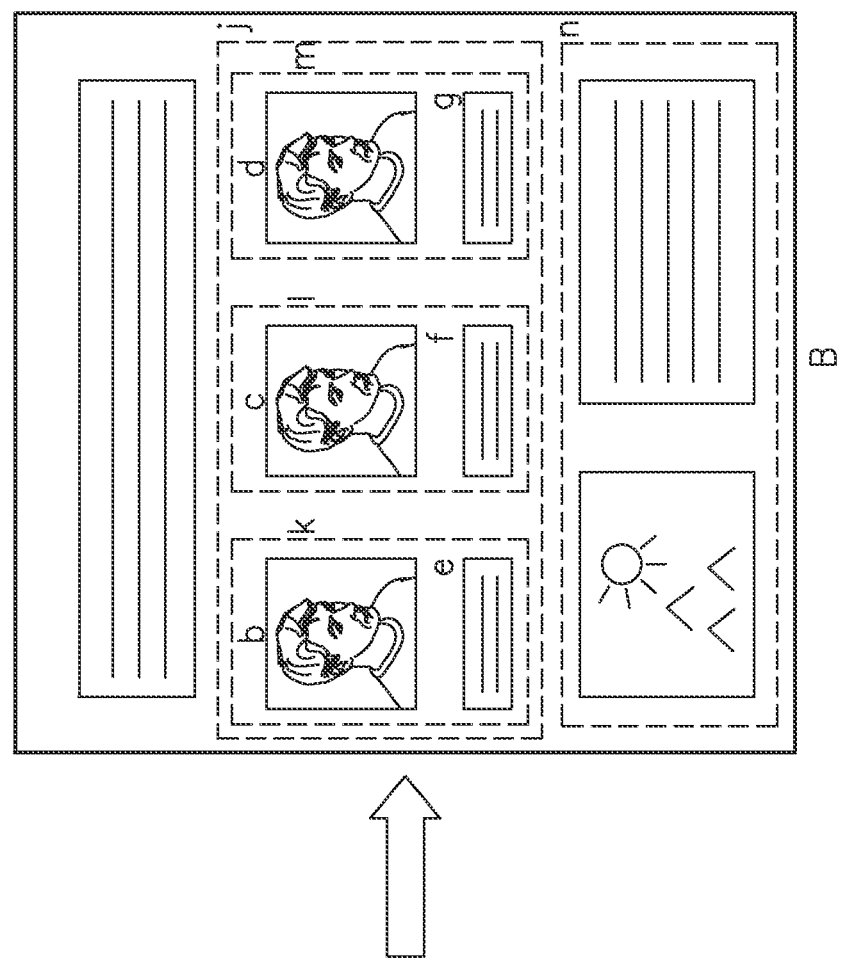
FIG. 10 is a pictorial illustration of a hierarchical grouping process performed on a page.
Figure 10:
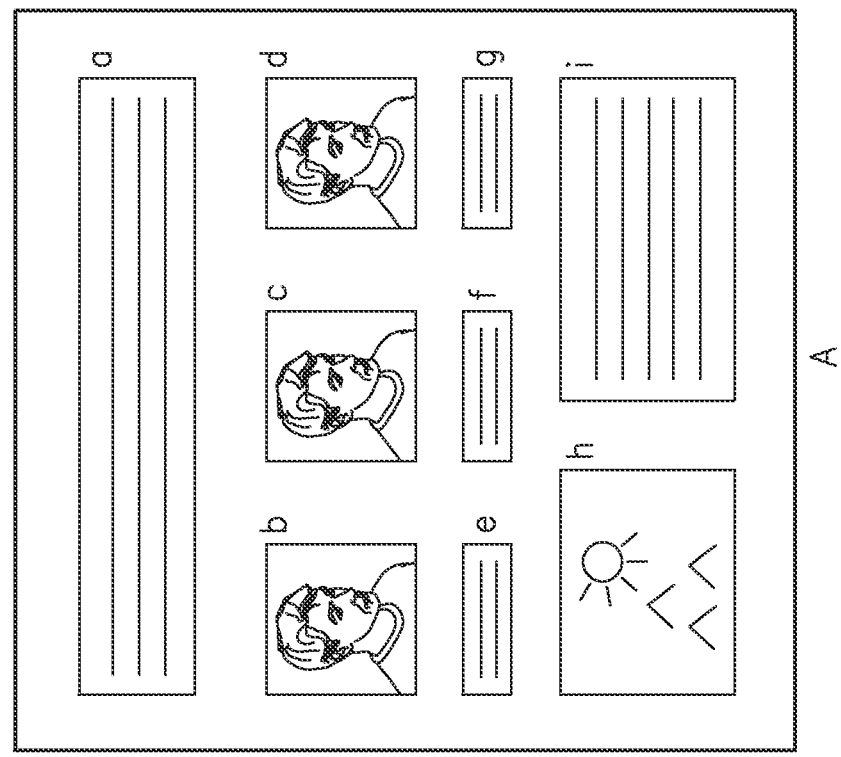
Figure 11:
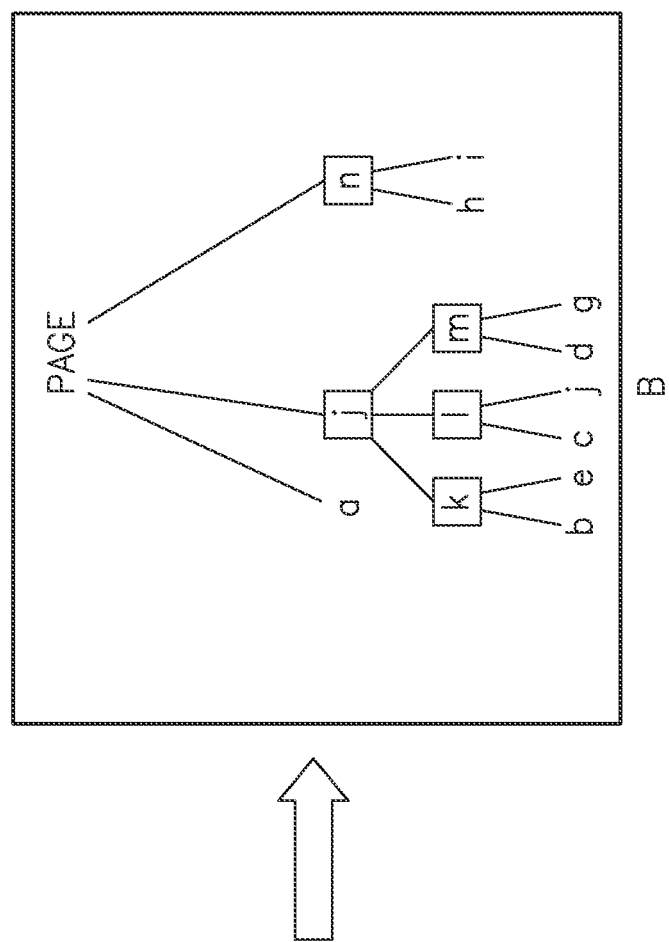
FIG. 11 is a schematic illustration of the hierarchy of the page of FIG. 10.
Figure 11:
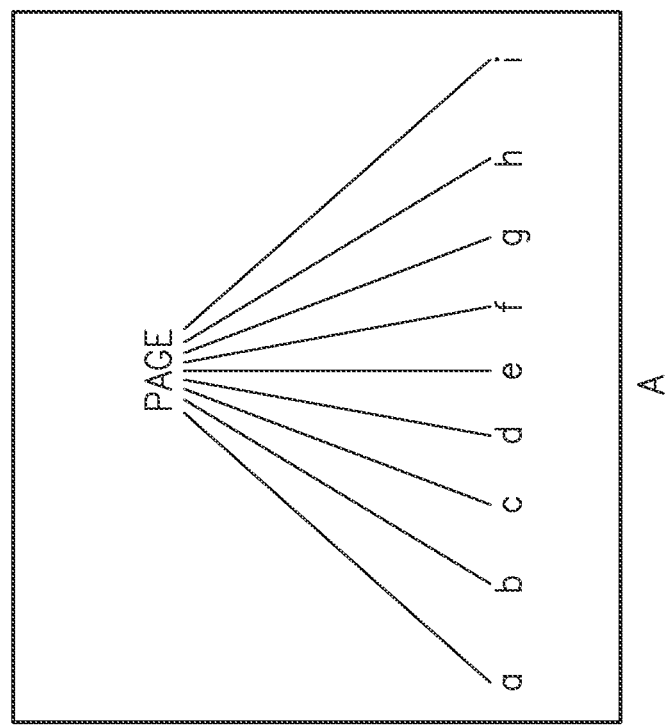

Reference is now made to FIG. 10 which illustrates a hierarchical grouping process. As is illustrated, page A shows pairs of pictures and associated captions (such as a person's picture and name) which should be grouped together ([b,e], [c,f] and [d,g]). Using its associated component grouping AI unit 310, component grouper 401 (FIG. 8) may group the components into three groups (k, l, and m) as shown on page B. Furthermore, component grouper 401 may group the three pairs together (on page A) to form an "our team" type group (j) (on page B) as defined by the shown hierarchy in FIG. 11 for pages A and B to which reference is now made.

It will be appreciated that the grouping hierarchy may differ from or even contradict the "natural" page containment hierarchy. For example, the grouping hierarchy may include sub-trees consisting of elements which technically reside in the same container level (i.e., are all siblings), and thus have no previously defined hierarchical relationship between them.

Furthermore, group definitions may cross container boundaries. For example, the page designer may have originally placed the three pictures (b, c, and d) from FIG. 9 in one container and the three text captions (e, f, and g) in a second separate container to help with their editing and alignment. However, the (content-related) grouping may cross these container boundaries as described herein above.

Component grouper AI unit 310 may be trained to use the container hierarchy information (if available as a feature) and also to "break" the container hierarchy where appropriate (e.g., based on human labeling).

Component grouper 401 may also integrate predefined grouping rules and methodologies (e.g., similar to the super node creator described in U.S. Pat. No. 10,176,154). Component grouper 401 may apply such rules and methodologies in conjunction with its component grouping AI unit 310 or to provide component grouping AI unit 310 with initial training data.

Component grouper 401 may also train its component grouping AI unit 310 to provide layout/group understanding, e.g. it may assign specific types to groups at all levels. Such types could be defined as being in the "WBS component world" (such as a list, a matrix, an image+caption, an image gallery, etc.) or the "real world" (such as a person's details, team members, offered products, etc.). System 200 may provide relevant taxonomies of both types, possibly including hierarchies of types. Such training may also be provided by a labeling tool which allows the user to label groups with their type. This group understanding serves as an additional layer of information which should be determined in addition to the group detection as described herein above.

Component grouper 401 may thus gather explicit feedback by offering the user a suggested grouping definition (possibly including a suggested group type as noted above) and allowing the user to, for example, approve the group definition, to reject the group definition, to select from amongst multiple grouping suggestions and to edit the provided definition, proposing the user's grouping definitions or alterations (e.g., merging, splitting, re-ordering or re-parenting groups).

Component grouper 401 may gather follow-up implicit feedback from later operations performed during editing. In particular, WBS editor 30 may offer group and ungroup operations, and these may provide additional feedback. Component grouper 401 may also gather feedback based on analysis of other operations, e.g., component insertions/deletions and operations performed on sets of elements. For example, if a text field and an image field are typically changed together, this may indicate that the two are interconnected (e.g., the text field describes the content of the image field) and should possibly be grouped.

Component group labeler 402 may support users when labeling groups of components in a (possibly hierarchical) manner. Such labeling may include both the composition of the group (i.e., what components the group includes) and the group meaning (i.e., what is the function of the group, such as "team member", "picture+caption", etc.). These labels may then be used to train other ML models 317 for group identification and group understanding.

Figure 12C:
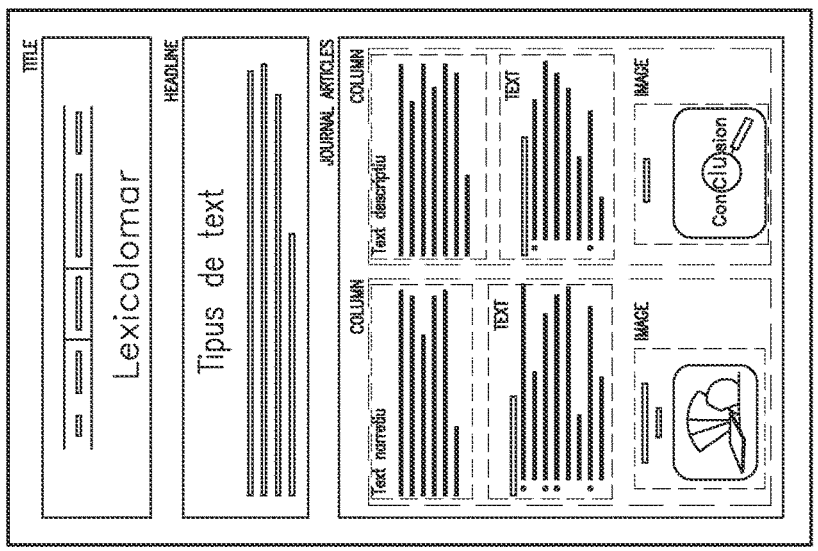
FIGS. 12A, 12B, and 12C are pictorial illustrations of group labels for the same web page defined at three levels of hierarchy.
Figure 12B:
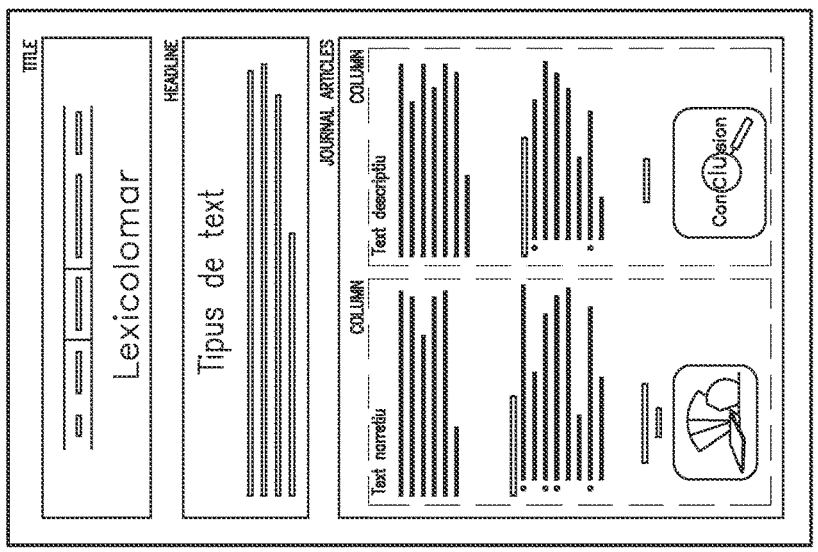
Figure 12A:
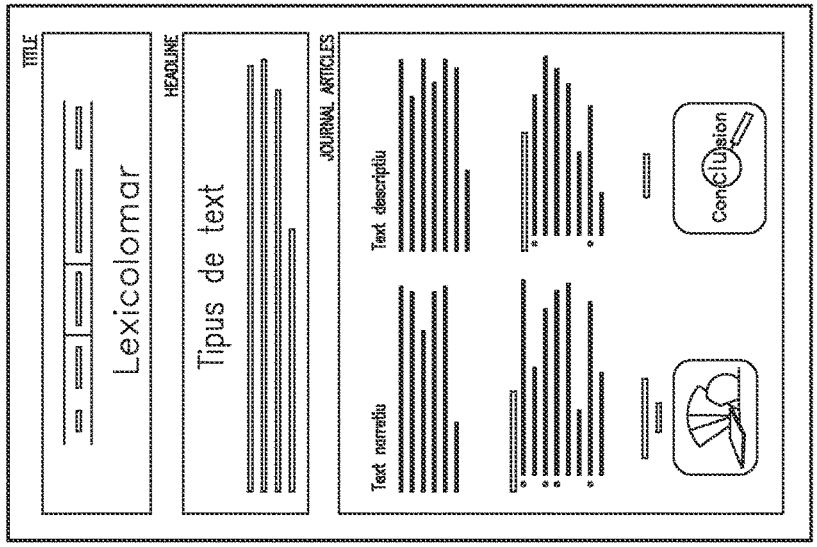

Reference is now made to FIGS. 12A, 12B, and 12C which illustrate group labels for the same web page defined at three levels of hierarchy. FIG. 12A shows a high level of hierarchy for the components. As a result, the components of the page have very general component labels, such as title, headline and journal articles. FIG. 12B shows a more detailed hierarchy of the components, where columns are added to the previous set of component types, along with their associated labels. FIG. 12C shows a highly detailed hierarchy of the components, where text and image are added to the previous set of component types, along with their associated labels.

Component group labeler 402 (FIG. 8) may label groups at various levels such as page sections, entire page, page sets or entire sites. Component group labeler 402 may be used to label sites developed within the WBS or from external sites (developed using other WBS's or non-WBS technologies or platforms). Component group labeler 402 may consist of multiple tool variants or embodiments aimed at performing the labeling for multiple supported platforms.

For sites created or hosted by the WBS, component group labeler 402 may be integrated with the WBS runtime server 20. Thus, it may support the labeling process with full information about the displayed components, their layout, their state, their content, and any additional information available to the WBS (including historical information such as editing history).

Component group labeler 402 may also be integrated with the user's activities in the site and with site changes occurring during the session and may thus "follow" the user and the site, synchronizing the labeling work with the site changes. Component group labeler 402 may follow for example, user activities which cause part(s) of the page to change, so previously labeled areas may become hidden or invisible, and new page areas, components or component versions or configurations may become visible. Component group labeler 402 may modify the grouping definition as a result. Component group labeler 402 may also follow changes to the site occurring due to dynamic layout, e.g., due to user edits (e.g., causing components to change their size, move or affect other component's layout) or due to non-user changes (components which reflect changes by made other users or dynamically changing data embedded into the components). It may also follow changes to the site occurring due to response layout, e.g., when the site switches between multiple layout versions depending on the width (or other parameters) of the display area.

Component group labeler 402 may also affect the WBS's functioning and behavior. For example, the component group labeler 402 may instruct WBS runtime server 20 to display the components handled by the user in a modified, alternative, simplified, frame-only or another mode which makes it easier to label them (e.g., by removing visual elements or clutter or otherwise clarifying the relationships between the various components).

Component group labeler 402 may also use the available information (from the WBS or otherwise) in other ways to support or to provide possible hints and directions to the user such as adding specific markings, alteration, animations or other UI elements (such as handles or inter-element connections) to components which may form a group.

As another example, component group labeler 402 may show the user the order in which components were added (or edited), or otherwise mark components which were added or edited during a given period or session. Such information may be directly available to the tool (based on the editing history information) or may be generated based on data analysis.

Figure 13A:
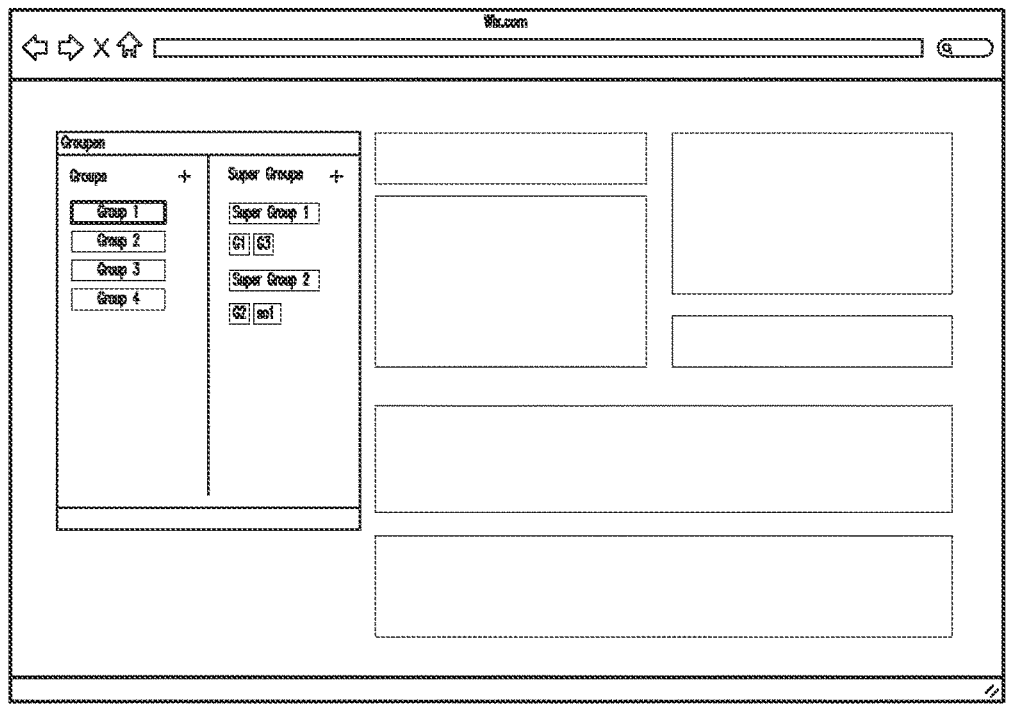
FIGS. 13A and 13B are illustrations of a labeling user interface useful in understanding a labeling process for grouping.
Figure 13B:
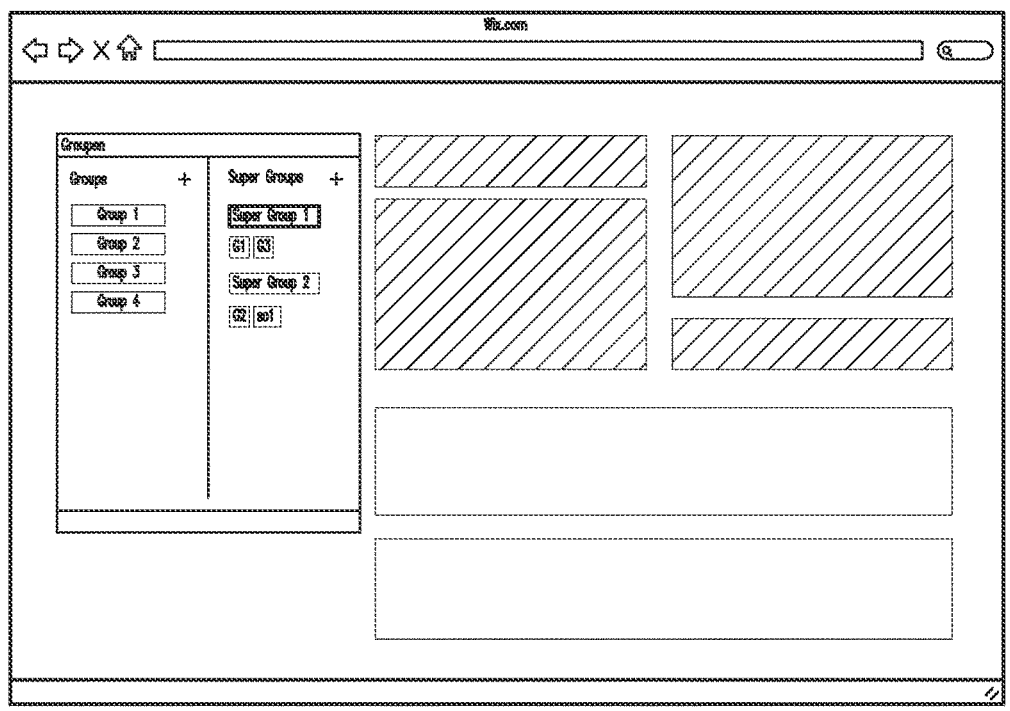

For sites implemented on external WBS platforms or non-WBS sites, component group labeler 402 may be implemented (for example) as a browser add-on or extension. Component group labeler 402 may then act as a layer of additional UI displayed in conjunction with the underlying site display and may allow the user to label the groups (and group hierarchy) in the displayed page(s) as is illustrated in FIGS. 13A and 13B to which reference is now briefly made. FIG. 13A illustrates a labeling UI and FIG. 13B shows the labeling UI once a few components are selected in order to be grouped.

In this scenario, component group labeler 402 may further interact with the browser and the displayed page document object (DOM) structure, e.g., by analyzing the DOM (on page loading, in real-time or otherwise). This interaction may allow component group labeler 402 to synchronize any group marking activity with changes in the displayed page.

Component group labeler 402 may further interact with the DOM of the underlying displayed page by making modifications to the DOM, in order provide hints to the user performing the grouping (similar to the changes performed to the page UI through interaction with the WBS as described above). Alternatively, component group labeler 402 may provide additional UI displays and hints via other means, such as via an additional (possibly semi-transparent) layer displayed on top of the displayed page.

Thus, component group labeler 402 may help in marking both WBS and non-WBS sites. It may (in both cases) use additional information available to it (e.g. as result of its analyses, extraction from the WBS or the DOM structure, etc.) as additional features added to the labels provided by the user.

In a typical scenario, component group labeler 402 may be used internally by WBS vendor 61 to train per activity AI units 310 which can be later deployed to regular (external) users. However, the WBS may also deploy system 200 to external users in some scenarios in which such users may be requested to provide grouping feedback for specific sites. For example, when a user wishes to create a site in the WBS using site generation system 40 and the user provides details of additional relevant sites (e.g., the user's own or competitor sites), the information extracted from such sites can be used by site generation system 40 when generating or modifying a site for the user. As part of the interaction, the user may be asked to point out or mark elements of the provided site. Such marking may include grouping information and may provide information about them, which site generation system 40 can provide to component group labeler 402 for use as part of the group labeling process.

Component group labeler 402 may also implement loopback integration with group labeler AI unit 310, using the grouping data. This way, component group labeler 402 may submit the page(s) being reviewed (or sections thereof) to group labeler AI unit 310 and may receive an initial grouping suggestion(s) from interaction generator 315. Component group labeler 402 may then present these suggestions to the user (in conjunction with the displayed page). The user may then review these suggested grouping indications (including editing them or creating a different grouping), and component group labeler 402 may provide this grouping to group labeler AI unit 310 for training.

Component group labeler 402 may compare the work done by multiple people (labelers) for the same pages(s) or component sets to see if they agree on how to define grouping for a given page or component set. Such a comparison may be based, for example, on the value of an adjusted rand index. This index measures the degree of similarity between different grouping definitions. Presumably, if multiple persons recommend the same (or similar) labeling, this labeling is more accurate or otherwise more reflective of what the best grouping should be.

Object analyzer 403 may detect specific objects or patterns in a site, such as logos. This is particularly relevant when analyzing a non-WBS site to detect a logo (e.g., for use in the site generation process). Such an analysis task can also include detecting "user composed" logos in existing WBS sites which were not marked or indicated as a logo.

Object analyzer 403 aims to detect sets of components which together form a logo. It will be appreciated that a user may compose a logo by combining multiple text, image and graphic elements (e.g., a star shape), without any indication that these elements form a logo (or any type of group together). Detecting such a logo could be especially difficult when analyzing a non-WBS site, in which the components are not directly defined as such, and their definition should be detected in the underlying HTML code. Object analyzer 403 may also include detecting a single component which is (by itself) the analyzed site's logo.

Object analyzer 403 may gather feedback on the logo detection task through an approval/rejection interaction with the user when presenting a detected logo. Object analyzer 403 may collect follow-up feedback by detecting if the logo was used in the published version of a site created based on the analyzed site (by direct conversion or site generation) or by detecting if the logo was moved to the top area for a mobile version of the site or added to a header which appears in multiple pages of the site. It will be appreciated that such operations may provide further feedback on how acceptable (or useful) the detected logo is to the user.

As discussed herein above, system 200 may use an ordering algorithm (such as the one detailed in U.S. Pat. No. 10,176,154) so as to define a linear order between displayed components which are arranged in a 3-dimensional layout. The linear order is typically defined based on a natural reading order of the page, although such an order may be difficult to define or may be ambiguous, and other possible orders may exist. Such a linear order may be required, for example, to utilize language-related per activity AI units 310 on component sets or to utilize AI units 310 which use a symbol sequence-based ML model 317. Such ordering may also provide the basis for additional system capabilities (and may provide input to additional task-specific AI units 310) such as conversion of an existing layout to mobile or different display parameters, providing responsive editing and display capabilities and providing alternative views of the site page(s) which rely on a given component order, such as reading the site for a blind user as part of the system's accessibility support.

Component orderer 404 may utilize an ordering AI unit 310 for component ordering which may be initialized using an explicit component ordering analysis (as discussed herein above) and may be further trained through feedback from users (possibly including feedback from end-users of the web sites created by WBS users or designers). Component orderer 404 may gather feedback by providing a UI which may allow attaching order numbers to components. Alternatively, component orderer 404 may have a simple "Oops" button which can be used by the end-user whenever the model provides the wrong order. The Oops button may be combined with a cursor to point to the location of the error (e.g., the location of the wrongly place component). Such a button may be used, for example, by a blind user to cause system 200 to re-read a mis-ordered set of components using a different order.

Object transformer 405 may transform a collection of objects, such as the components in a web page with their layout and other associated information (the source object set) into a modified target object set. The transformation is typically based on a preliminary analysis of the source object set, such as the grouping and ordering analyses described herein above.

It will be appreciated that the following discussion on object transformer 405 is directed to web page transformation. However, the same processes may apply to page sections or a subset of a page (e.g., the content of a given container), page sets (including complete web sites), arbitrary component collections as well as other non-web component or element sets.

It will be appreciated that a transformation can be made at multiple levels such as when both the source and target object sets are the same website page (e.g., in the WBS) and transformation involves changing some components, layout, and attributes. An example would be modifying the components and the layouts in a desktop version of the page to generate a mobile version of the page.

Another level is when the source and targets object sets are generally different pages in the same platform (e.g. WBS), and object transformer 405 may transfer content, layout and design information from the source object set to the target object set. An example would be processing a site built based on a specific template and transferring its contents, layout, and design (and the changes made to the original source template) to a new target template.

A further level is when the source and target object sets are pages on different platforms. An example would involve importing pages to the WBS from a different WBS, or a non-WBS site. Unlike the previously described types of transformation tasks, in this type of transformation, the source and target object sets are really in "different languages", the set of available components and attributes may be substantially different between the source and the target platforms. In fact, when converting from regular (HTML/JS) web pages, the source page may have no component definitions (unlike pages defined in the WBS of the present invention).

Object transformer 405 may use an object transformer AI unit 310 adapted to the realm of natural language processing including both language analysis and generation models (possibly through ordering of the various components). Some of these tasks (and the related facilities and models) are described in more detail herein below.

The object transformer AI units 310 may be trained using matching pairs of source and target object sets. Such pairs can be provided by WBS vendor staff 61 and others as discussed herein above. Such pairs may also be gathered using implicit feedback data extracted from users correcting an initial solution provided by system 200. The per object transformer AI units 310 may also be trained using other explicit and implicit feedback forms and interactions as discussed in more detail herein below.

It will also be appreciated that existing WBSs often need to retarget sites built for the desktop to different screen sizes, such as those found in tablet and mobile devices (as well as different display windows sizes). Such tablet and mobile devices have no standard screen size, and numerous sizes exist in the market. The transformation made to the pages to conform to different screen sizes is substantial and may involve re-arrangement of the components so as to avoid horizontal scrolling and minimize vertical scrolling. It may also involve changing component types (e.g., changing a grid gallery to a mobile-ready slider gallery), modifying the component's layout and other attributes, adding components (e.g., a mobile navigation bar), dropping components (e.g., decorative components which are not needed in the mobile version) and other changes.

Existing systems are typically based on analysis of the page layout and elements, and the use of rule engines to provide layout changes and other page changes. One such system is described in U.S. Pat. No. 10,176,154.

Desktop to mobile transformer 406 may use a desktop to mobile transformer AI unit 310 that can be trained using the relevant rule engine on existing sites. It may also be trained using previously converted sites (which may have been edited by their designer to improve the suggested rule-based version). It may also be trained based on newly converted sites, i.e., based on the changes made by the users to sites converted using the model.

An alternative training approach may use an analysis-based page transformation algorithm assisted by an appropriate per activity AI unit 310. For example, U.S. Pat. No. 10,176,154 describes such an analysis-based algorithm which incorporates grouping of related components (e.g., a picture and caption pair) and hierarchical determination of a reading order of the page's components. The application describes multiple methods for the analysis of the page and determination of such grouping and ordering.

WBS importer 407 may analyze non-WBS sites and may create a matching WBS site. This could be conversions of sites from a source WBS to a target WBS or could be the conversion of a regular (HTML-based) site to a site within a target WBS. In the first instance (WBS to WBS), the main issue is mapping components and attributes from the source WBS to the target WBS. In particular, the two WBSs may be using different data models, architectures, and/or concept sets. For example, one of them may allow hierarchies of pages to be created, while the other may use a different mechanism to connect related pages. One of the WBSs may define some capabilities (such page routing menus) using components and layout definitions whereas the other WBS may express these capabilities via data tables or procedural definitions.

In the second case (HTML to WBS), the WBS importer AI unit 310 has to detect complex components from within the HTML, as the HTML representation of such complex components may consist of multiple HTML elements which may seem unrelated. For example, a single WBS video player component may be implemented in HTML using multiple frames, a video display window, multiple buttons (for stop, start, pause, . . . ) and other controls. The video-player elements may be spread over multiple HTML element sub-hierarchies and mixed with other page elements. The model should be able to recognize such combinations of HTML elements and to map them into a single video player component (with the right attributes and layout information).

WBS importer 407 may use multiple WBS importer AI units 310. In particular, an initial WBS importer AI unit 310 may provide an analysis of the element hierarchy in the site. The WBS importer AI unit 310 may also analyze the context of the element in the hierarchy, in order to recognize (for example) that a given sub-hierarchy represents an "about us" element of the site. Such analysis may be expressed using semantics similar to that for layout elements as described in U.S. Pat. No. 10,073,923.

A second WBS importer AI unit 310 may handle the analysis of the layout of the site, as well as the understanding of additional properties of the site such as the responsive behavior of the site as described in more detail herein below (i.e. what are the breakpoints in screen width in which the site changes its element configuration to provide responsive design). An exemplary responsive design and editing system is described in U.S. Pat. No. 10,984,177 entitled "System and Method Providing Responsive Editing and Viewing, Integrating Hierarchical Fluid Components And Dynamic Layout", granted Apr. 20, 2021, commonly owned by the Applicant and incorporated herein by reference.

Figure 14:
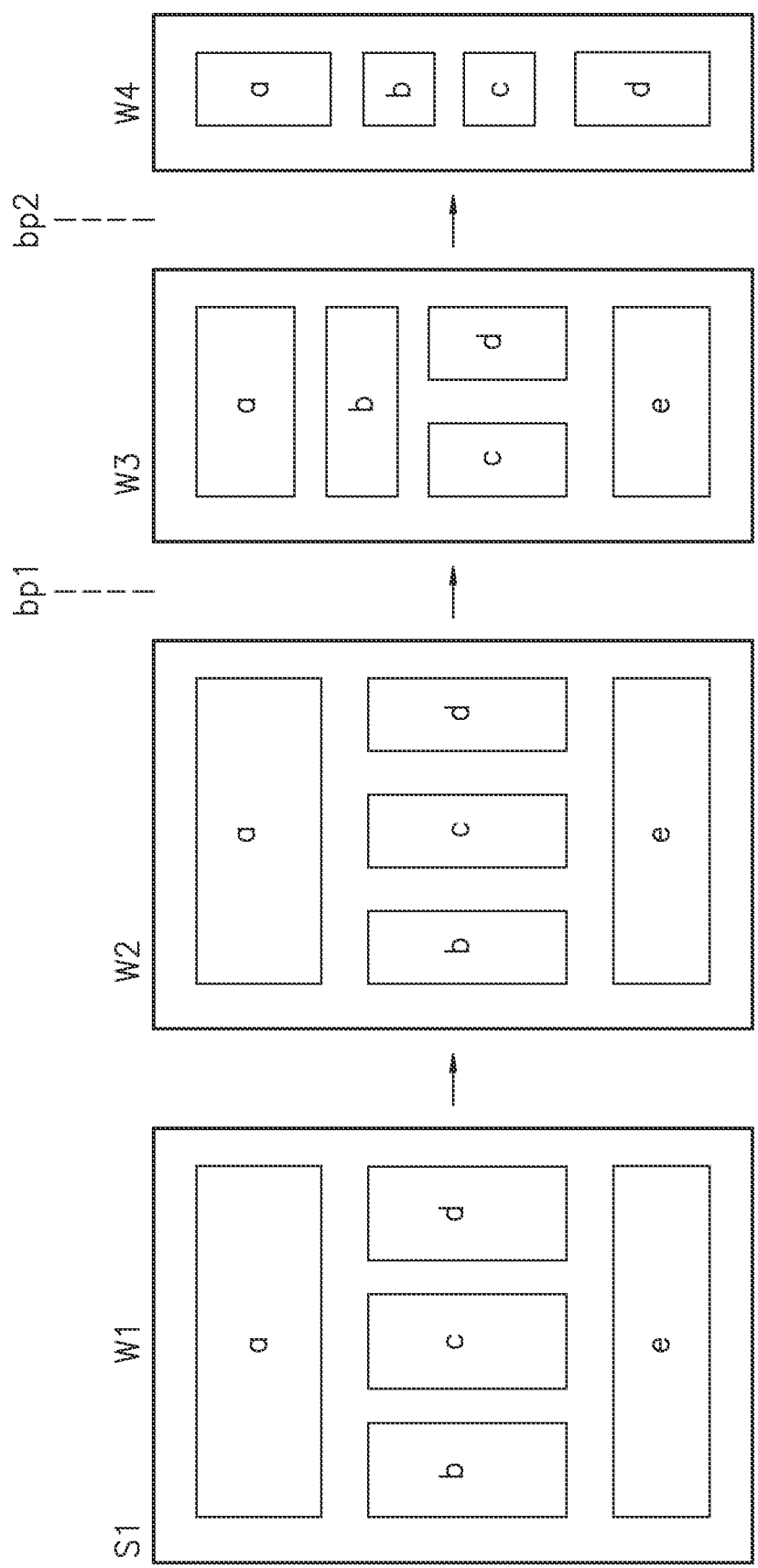
FIG. 14 is a pictorial illustration of how a given layout can be displayed on multiple available screen widths.

Reference is now made to FIG. 14 which shows how a given layout can be displayed on multiple available screen widths. As is shown, a given layout S1, consisting of 5 components a-e, is displayed on four different screens having widths (W1 . . . W4). For widths W1 and W2, components a-e are laid out in a similar manner, with component a on top, components b-d in a single row under component a, and component e on the bottom. For much narrower width W3, component a remains on top, followed by component b, followed by components c and d in a single row, and component e on the bottom. For very narrow width W4, only components a-d are shown, in a single column.

In FIG. 14, the widths W1-W4 are divided into ranges by two breakpoints bp1 and bp2. As can be seen, changes in the width may cause the components a-e to change size, position, relative relationship and even to be removed from the layout in some cases (as is component e in the width w4). WBS importer 407 may analyze the site to determine if such breakpoints are already defined for the site, and which breakpoint values should be used (pre-defined ones or new ones). WBS importer 407 may also analyze any existing responsive behavior (which may be mapped to the WBS version) and may determine the best responsive behavior to use.

It will be appreciated that responsive sites can be viewed as sites having a set of breakpoint ranges with a separate layout and component configuration for each of the ranges. Furthermore, each range may have its own dynamic layout rules which may control the behavior of the components (e.g., moving or resizing) when the display size changes with the range (or other changes occur such as component content changes).

WBS importer 407 may provide as input to its per activity AI unit 310 an off-line copy of the original site, using a single form of the site (e.g., desktop only). The second per activity AI unit 310 may require some interaction with the actual site, e.g., in order to test it under multiple display configurations (which may also be done with the actual site or an off-line copy thereof).

It will be appreciated that for WBS importer 407, the feedback may be provided as described herein on above (training on converted sites, implicit user feed resulting from model result correction, etc.). System 200 may also provide a specialized imported site editor to provide implicit feedback just after the import processing is ended. Such a specialized editor may provide additional feedback, e.g., displaying the hierarchy analysis results and allowing the user to edit the hierarchy in ways not provided by WBS editor 30.

As discussed herein above, responsive site structure is described in the context of importing sites into the WBS. In this context, system 200 may import existing responsive site definitions from non-WBS sites.

However, responsive site handling may also be relevant when directly editing sites defined within the WBS. This may include adding responsive behavior (including breakpoints and multiple configurations) to a previously non-responsive site, as well as editing existing responsive sites. It will be appreciated that editing a responsive site may include editing the breakpoint range definitions (modifying, adding, removing, splitting, or merging). Such editing may also include editing the components and their layout or configuration for a specific breakpoint range, affecting changes which system 200 may try to apply (with the relevant modifications) to the layout or configuration for other breakpoint ranges.

As an example of the above, the user may make a change (such as adding a new component) to the layout for a specific breakpoint range. System 200 may apply the changes (if and when relevant and with the relevant adaptation) to the layout for the associated other breakpoint ranges. Assuming (for example) that a given WBS site has three configurations (for three breakpoint ranges), which may be two desktop configurations (A and B) and one mobile configuration (M). If a component is added to configuration A, system 200 may support automatically adding the component (with modified size and position) to configuration B, and adding a mobile version of the component to configuration M.

Responsive editing supporter 408 may use changes and edits made by the user to one website configuration or another to train its associated responsive editing AI unit 310. In an alternative embodiment, interaction generator 315 may generate multiple alternatives for applying the user's changes made to one configuration on the other configurations. The user may be asked to select which alternative to use. Responsive editing supporter 408 may use this feedback to train its responsive editing AI unit 310. It will be appreciated that responsive editing supporter 408 may operate either with site generation system 40 or with editor 30 or both, as necessary.

As discussed herein above, system 200 may provide the user with the ability to perform template replacement. Users (designers) often build their sites based on a template provided by WBS vendor 61. The user may perform a substantial modification to this underlying template, including design and layout changes, insertion and removal of pages, page elements and site sections as well as the entry of user-specific site text, media, and data. The user may later desire to switch to a different template, which would require the user to map the changes (layout and content) to the new template and reapply them as appropriate (in a template conversion session).

Template replacement may or may not be possible in some cases. For example, sites created using site generation system 40 are highly structured and are typically based on a hierarchy of layout elements (as described in U.S. Pat. No. 10,073,923). The editing of such sites may be limited so that the highly modular layout elements are preserved, e.g., system 200 may prevent the user from moving components from one layout element to another. Furthermore, the layout elements may be associated with underlying content elements which are not part of the visual design and are thus not visually modified during site editing (e.g. the changes are typically limited to changes to content).

It will be appreciated that the situation may be different with freely edited web sites, i.e., web sites created using the regular WBS editor 30. The source and target templates may not correspond in the first place, and any existing similarities between the two templates may have been destroyed through changes made by the user. Thus, accurate mapping may be impossible.

Template replacer 409 may provide a machine learning based solution to this problem. Template replacer 409 may provide a partial solution, mapping some of the content, layout, and other changes made in the source template while omitting some content which may be impossible to map to the target template.

Template replacer 409 may also make use of hints added to the templates by their creators (e.g., the WBS vendor 61 staff) which may convey additional information on template element equivalences. For example, WBS vendor 61 may mark different sections of different templates with semantic markers (e.g., marking a given set of components with an "our company history" marker). These markers may be comparable to the set of content elements/layout elements defined in U.S. Pat. No. 10,073,923 or may be a different set of group types which may be detected by template replacer 409 for the template replacement. Other modules in site function updater 400, such as component grouper 401, component grouper labeler 402 and component orderer 404, may assist template replacer 409 to determine the group types. The resulting template replacement may also be similar to (and may share elements with) the transformations performed by object transformer 405 and WBS importer 407.

Template replacer 409 may include a specialized editor which may provide an additional indication as to which content/layout was successfully transferred (and how), and what was not transferred, and may also allow the user to correct and complete the transfer results. This editor could also be integrated into WBS editor 30 (e.g., as a task list, a wizard or a workflow system).

It will be appreciated that a template replacement AI unit 310 used by template replacer 409 may be trained with pairs of sites converted between templates. The template replacer AI unit 310 may also be trained with follow up corrections made to the converted site using the specialized editor described above, as well as changes made to the site using WBS editor 30. The template replacer AI unit 310 may also be trained with sets of templates for which content-equivalence hints have been specified (as described above) even if no or partial specific content has been inserted.

It will be further appreciated that training template replacement AI unit 310 may be difficult, as there may be very few relevant conversion sessions per template pair. As the number of templates grow, the number of possible template pairs (source site template and target site template) may also grow. Template replacer 409 may generalize and may determine what the required operations are, given good examples. Template replacer 409 may employ, for example, the following approaches or a combination thereof. Template replacer 409 may train a separate per activity AI unit 310 for a given template pair with all the conversion sessions for the given pair or may train a separate model for each group of "similar" pairs (as defined by WBS vendor 61), or may train a single model for all pairs together.

The collected training data may still include features identifying the source and target templates and their parameters and attributes (e.g., business domain and general style, as well as more detailed features). Training a model for each group of similar pairs or for all pairs together (with the relevant pair information features) may be preferable since in many cases there may be similar pairs, even in multiple domains.

For example, WBS vendor 61 may create a set A of elegant style templates (e.g., for fitness studios and clothing stores) with some similarity between all templates in A. Later WBS vendor 61 may similarly create a set B of formal style templates (for the same or different business domains). The user may then convert some sites created with templates from group A to use with templates from group B. Such conversions may typically occur within the same business domain (i.e. converting a fitness studio A template to a fitness studio B template). In this scenario, the template conversion AI unit 310 may benefit from being trained with information gathered from multiple conversion sessions between group A templates and group B templates, typically with added features such as "group name" (A, B or others) and "business domain". This could be much better than training a separate model for each specific pair [A member, B member] which was actually used.

Template replacer 409 may also use multiple per activity AI units 310 for separate functionality areas (e.g., one to analyze the site's hierarchy and structure and one to analyze layout and additional attributes) as described above for WBS importer 407.

As described herein above, sites created using site generation system 40 may be highly structured. One major advantage of this highly structured layout element hierarchy is that sites may be easily re-generated after their underlying data has been modified. System 200 may update the relevant content elements, re-evaluate content element-layout element association and layout element arrangement and re-generate the layout element hierarchy and the resulting pages as required. On the other hand, regular (manually edited) sites use a less rigid component hierarchy. Their structure has evolved through a series of editing sessions, e.g., during the creation of an underlying template and editing of the actual web site. Such sites cannot simply be re-generated when the underlying data has changed.

Thus, the user may desire to convert a manually edited site into the format employed by site generation system 40. Manual site adapter 410 may use one or more per activity AI units 310 to detect groups in the WBS component hierarchy and to determine semantic connections between the components. Manual site adapter 410 may then match these groups against the existing set of site generation system structures (including content elements and visual site sections) and may construct the matching site generation system form of the site.

Similar to the functionality of WBS importer 407, manual site adaption AI unit 310 may be trained on existing site pairs (pre- or post-conversion sites). It may also be trained based on later modifications made by the user to the post-conversion version (e.g., through the site generation system limited editor).

Design suggester 411 may allow the user to select a set of components, query the WBS, receive alternative options for the selected set layout/design, select a preferred layout/design option and apply the preferred layout/design option to the selected component set. Design suggester 411 may integrate suggested alternative quality ratings and diversifications similar to that discussed in U.S. Pat. Nos. 9,996,566 and 9,747,258.

It will be appreciated that design suggester 411 may base its offers on layouts gathered from multiple sources (other sites in the WBS, pre-built templates, non-WBS sites, etc.) or on constructed layouts created based on the components in the selected set. Furthermore, when applying the preferred layout/design to the selected component set, they may not match precisely, and system 200 be required to extend or modify the elements of the suggested or preferred layouts/designs in order to create a match.

It will further be appreciated that design suggester 411 may benefit from the technologies described herein above by including design suggesting AI units 310 supporting the following functions and receiving user feedback gathered from the user's interaction with the system. This process may be done in a number of phases.

Phase 1 is layout gathering. As discussed herein above, per activity AI units 310 may support importing from multiple sources, including understanding and analysis of the imported layouts (such as the ML models 317 associated with WBS importer 407 as described herein above).

Design suggester 411 may implement and train a specific layout extraction AI unit 310 for the creation of suggested layouts. Such a specific layout extraction AI unit 310 may provide better results than a full-scale site importation model, as layout extraction AI unit 310 may be required to extract only abstract layout information (which is more abstract or generalized) and not full component information or actual component content. For example, when importing a layout containing a video component, a full layout extraction AI unit 310 may identify the exact video used and its display attributes, whereas an design suggesting AI unit 31 may only need the video component frame position and size and which associated video controls are included (as the actual video clip will be replaced by that specified by the user).

The design suggester AI unit 310 may be trained with user feedback collected from follow-up editing. Design suggester 411 may classify follow up changes, as not all changes indicate an error in the original extraction. For example, design suggester AI unit 310 may interpret a given combination of HTML elements in an imported site as an image gallery, and the user may later change this into a video gallery. This change could indicate an error in the original understanding of the examined site, or a decision by the user to change the component type in the suggested layout. Design suggester 411 may implement such a change in classification based, for example, on how many users made this change (e.g., if many users made the same change to this layout, it is more likely that the original extraction was erroneous).

Phase 2 is the selection of layouts to suggest and interaction with the suggested layouts. In this post-query phase, design suggester 411 may select, rank and present the design alternatives to the user. Design suggester 411 may employ a selection and ranking AI unit 310 to support these functions.

Such a selection and ranking AI unit 310 may initially be trained using examples of selection and ranking based on rating and diversification algorithms such as the ones described in U.S. Pat. Nos. 9,747,258 and 9,996,566. Selection and ranking AI unit 310 may be further trained based on input from the user. The features used may therefore include the original user-selected set passed to the query. The features could include the actual component data (including type, layout, content, and attributes), as well as a semantic signature describing the component set (as described in U.S. Pat. Nos. 9,747,258 and 9,996,566). The features may further include additional parameters and features such as user parameters and site parameters (as described herein above). Such features would allow the design suggesting AI unit 310 to adapt to specific user and community tastes, e.g., a regional preference for a more colorful or more formal design.

Other input features may further include the actual selection made by the user, including possibly additional alternatives reviewed by the user but not selected and the level of use of the resulting page (e.g., was it published and when?).

Phase 3 is the adaptation of the selected component set to a selected result layout. It will be appreciated that such adaptation may also be performed using an adaptation AI unit 310 trained for this task. The adaptation AI unit 310 may be initially trained based on a component matching and adaptation algorithm. Later, it may be trained based on user feedback as collected implicitly from changes made by the user to the adapted layout.

Thus, an alternate design may be implemented using not just pre-defined component import, query, matching, ranking, and diversification algorithms, but also using one or more per activity AI units 310 to support the required functionality. Such per activity AI units 310 may be further trained using feedback collected from the users during further sessions.

Thus, machine learning/artificial intelligence models may be incorporated into standard WBS functionality and editing tasks. These models may be trained and continually updated using feedback based on both implicit and explicit information.

Furthermore, the previous discussion focused on websites hosted by the website building system provider (which implements system 200). However, system 200 may be implemented with additional types of websites and other non-web digital creations. These may include, for example, the following (or any combination thereof): full websites and website sections (e.g., a subset of the website's pages) or sections of one or more website pages, websites designed for regular desktop computer viewing, mobile websites and tablet-oriented websites, websites created by a website building system but hosted externally (i.e., not by the website building system vendor), websites running locally on a local server installed on the user's machine and websites which serve as a UI and are hosted within other systems (including embedded systems and appliances).

Other types of websites and other non-web digital creations may also include websites or other displayed visual compositions hosted within larger systems, including (for example) pages hosted within social networks (such as Facebook), blogs, portals (including video and audio portals which support user-customizable page such as YouTube channels), etc. This may include other types of remotely accessible online presence which are not regarded as a website.

Other types of websites and other non-web digital creations may also include interactive (mobile or otherwise) applications, including hybrid applications (which combine locally-installed elements with remotely retrieved elements) and non-interactive digital creations, such as e-mails, newsletters, and other digital documents.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS), the system comprising:
 a database storing at least websites of a plurality of users of said WBS, and components of said websites; and
 a processor implementing at least one dynamically updatable machine learning
 model suitable for at least one specific activity related to said WBS and to provide at least one system suggestion to said users related to said at least one specific activity;
 wherein said at least one specific activity related to said WBS comprises at least one multi-component task for handling of websites within said WBS;
 wherein at least one machine learning model is trained using at least different object types and feedback types;
 a feedback system to dynamically update said at least one machine learning model using implicit feedback about editing behaviors within said WBS and explicit feedback to suggestions and at least one proposal from at least said users, said feedback system to evaluate a response quality of said feedback and to analyze both said explicit and implicit feedback to determine which of said at least one machine learning model to update.

2. The WBS according to claim 1 and wherein said feedback system comprises:
an implicit feedback handler to analyze at least editing histories of said users to determine what further activity said users perform on their websites and/or within said WBS and to generate said implicit feedback to train relevant said at least one machine learning model.

3. The WBS according to claim 2 and wherein said feedback system also comprises:
an explicit feedback handler to analyze at least user responses to said at least one system suggestion to determine how said users respond to said at least one system suggestion and to generate said explicit feedback to train relevant said at least one machine learning model.

4. The WBS according to claim 2 said implicit feedback handler to receive information gathered from within said WBS, wherein said information comprises disposition of the component and at least one of the following: business information, user information, and site information.

5. The WBS according to claim 1 and wherein said at least one specific activity further comprises a single component task for handling websites within said WBS and wherein said single component task comprises at least one of: image resolution improvement, face detection, portrait segmentation, objection segmentation, image cropping, image enhancement, logo creation and site text generation.

6. The WBS according to claim 1 and wherein said at least one multi-component task comprises at least one of: component grouping, component group labeling, component ordering, object analysis, object transformation, desktop to mobile transformation, importation of websites, template replacement, support of responsive editors and alternate design suggestion.

7. The WBS according to claim 1 and wherein said at least one machine learning model is a model suited to the task and selected from one or more of the following types of models: supervised, unsupervised, prediction algorithms, classification algorithms, clustering algorithms, association algorithms, time-series forecasting algorithms, image to image models, sequence to sequence models, and Generative models.

8. The WBS according to claim 1 and wherein said feedback system comprises at least one of:
a response evaluator to evaluate said response quality of feedback responses from said users;
a user evaluator to evaluate a user quality in giving feedback;
a vendor handler to analyze feedback at least from vendor staff of said WBS; and
a community handler to analyze feedback at least from a community of users.

9. A method for a website building system (WBS), the method comprising:
storing at least the websites of a plurality of users of said WBS, and components of said websites;
having at least one dynamically updateable machine learning model suitable for at least one specific activity related to said WBS;
providing at least one system suggestion to said users related to at least one specific activity;
wherein said at least one specific activity related to said WBS comprises at least one multi-component task for handling of websites within said WBS;
training at least one machine learning model using at least different object types and feedback types;
dynamically updating said at least one machine learning model using implicit feedback about editing behaviors within said WBS and explicit feedback to suggestions and at least one proposal from at least said users;
evaluating a response quality of said feedback; and
analyzing both said explicit and implicit feedback to determine which of said at least one machine learning model to update.

10. The method according to claim 9 and wherein dynamically updating said at least one machine learning model comprises:
analyzing at least editing histories of said users to determine what further activity said users perform on their websites and/or within said WBS; and
generating therefrom implicit feedback to train relevant said at least one machine learning model.

11. The method according to claim 10 and wherein said dynamically updating said at least one machine learning model also comprises:
analyzing at least user responses to said at least one system suggestion to determine how said users respond to said at least one system suggestion; and
generating therefrom explicit feedback to train relevant said at least one machine learning model.

12. The method according to claim 9 and wherein said at least one specific activity further comprises a one single component task for handling websites within said WBS and wherein said single component task comprises at least one of: image resolution improvement, face detection, portrait segmentation, objection segmentation, image cropping, image enhancement, logo creation and site text generation.

13. The method according to claim 9 and wherein said at least one multi-component task comprises at least one of: component grouping, component group labeling, component ordering, object analysis, object transformation, desktop to mobile transformation, importation of websites, template replacement, support of responsive editors and alternate design suggestion.

14. The method according to claim 13 said generating said explicit feedback to receive information gathered from within said WBS, wherein said information comprises disposition of the component and at least one of the following: business information, user information, and site information.

15. The method according to claim 9 and wherein said at least one machine learning model is a model suited to the task and selected from one or more of the following types of models: supervised, unsupervised, prediction algorithms, classification algorithms, clustering algorithms, association algorithms, time-series forecasting algorithms, image to image models, sequence to sequence models, and Generative models.

16. The method according to claim 9 and wherein said dynamically updating said at least one machine learning model comprises at least one of:
evaluating said response quality of feedback responses from said users;
evaluating a user quality in giving feedback;
analyzing feedback at least from vendor staff of said WBS; and
analyzing feedback at least from a community of users.

* * * * *